(12) United States Patent
Gimlan

(10) Patent No.: US 6,936,994 B1
(45) Date of Patent: Aug. 30, 2005

(54) ELECTROSTATIC ENERGY GENERATORS AND USES OF SAME

(76) Inventor: Gideon Gimlan, 100 Lasuen Ct., Los Gatos, CA (US) 95032

( * ) Notice: Subject to any disclaimer, the term of this patent is extended or adjusted under 35 U.S.C. 154(b) by 102 days.

(21) Appl. No.: 10/233,815

(22) Filed: Sep. 3, 2002

(51) Int. Cl.[7] .......................... H01M 10/44; H01M 10/46
(52) U.S. Cl. ........................................ 320/101; 322/2 A
(58) Field of Search .................. 322/2 R, 2 A, 322/100; 320/166, 167, 101; 323/272, 276; 363/50

(56) References Cited

U.S. PATENT DOCUMENTS

| | | | |
|---|---|---|---|
| 4,087,735 A | | 5/1978 | O'Hare |
| 4,127,804 A | | 11/1978 | Breaux |
| 4,717,960 A | * | 1/1988 | Shikano et al. ............. 348/365 |
| 5,998,977 A | * | 12/1999 | Hsu et al. .................... 323/272 |
| 6,127,812 A | | 10/2000 | Ghezzo et al. |

* cited by examiner

*Primary Examiner*—Edward Tso

(57) ABSTRACT

Methods and devices are disclosed for electrostatically generating electrical energy in response to state changes of external energy sources. In a simple embodiment, a first diode directs priming current from a first rechargeable battery into a variable capacitor means when the latter means is in a charge desorbed mode (charge absorbing mode). An external energy source switches the variable capacitor means into a charge expelling mode while absorbed charge is trapped in the variable capacitor means. After a predefined increase in voltage is realized, a second diode directs expelled charge from the variable capacitor means to a series circuit composed of a profit-charge storing means (e.g. a second rechargeable battery) and the first rechargeable battery, thereby returning the invested charge back to the donor (the first rechargeable battery) and causing a profit amount of charge to be stored in the profit-charge storing means (the second rechargeable battery). The variable capacitor means may take on many forms including those which switch between their charge absorbing and charge expelling modes in response to thermal agitation. Various forms of nonelectrical energy sources and ways for electrostatically converting their energies into electrical energy are disclosed.

50 Claims, 12 Drawing Sheets

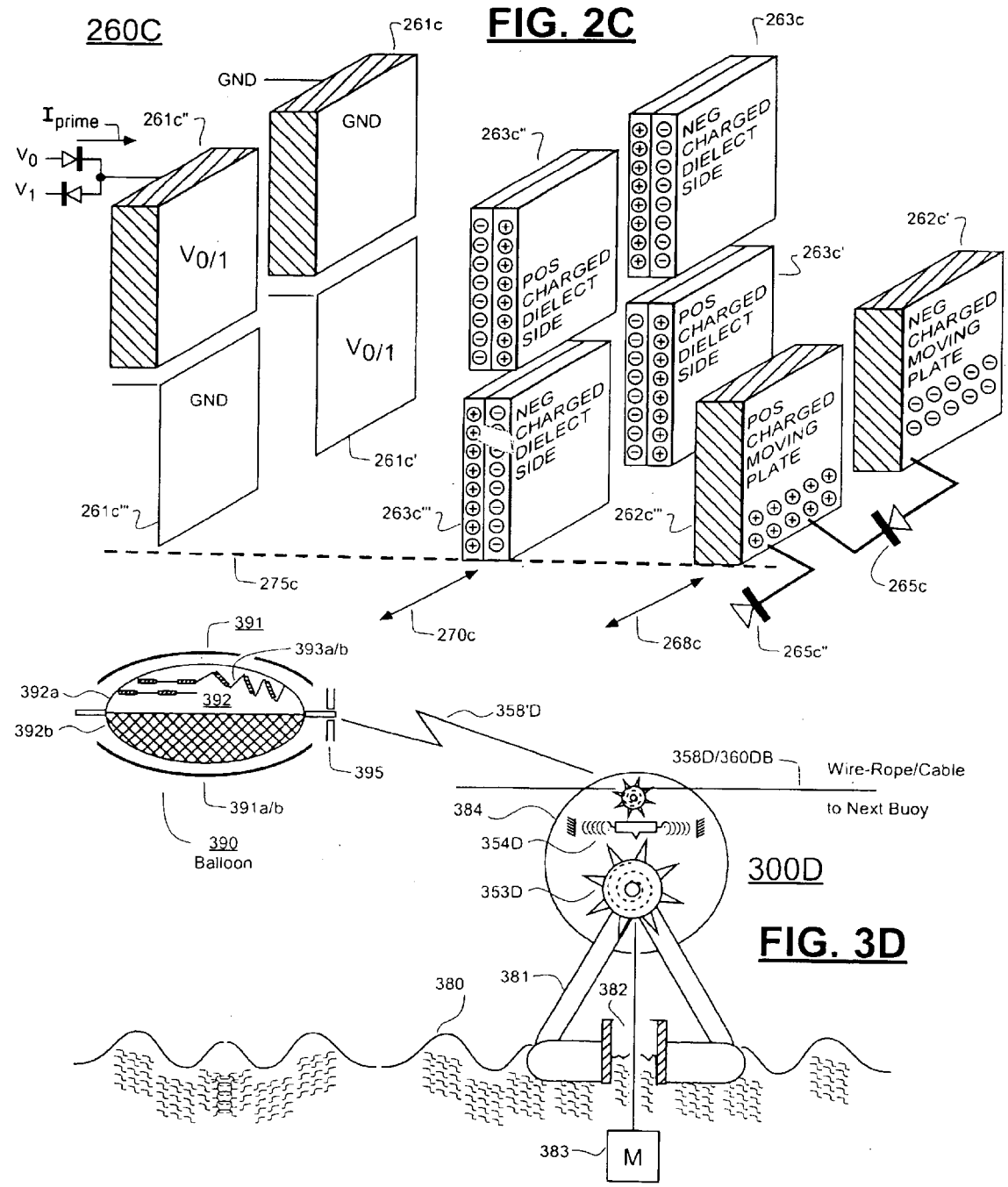

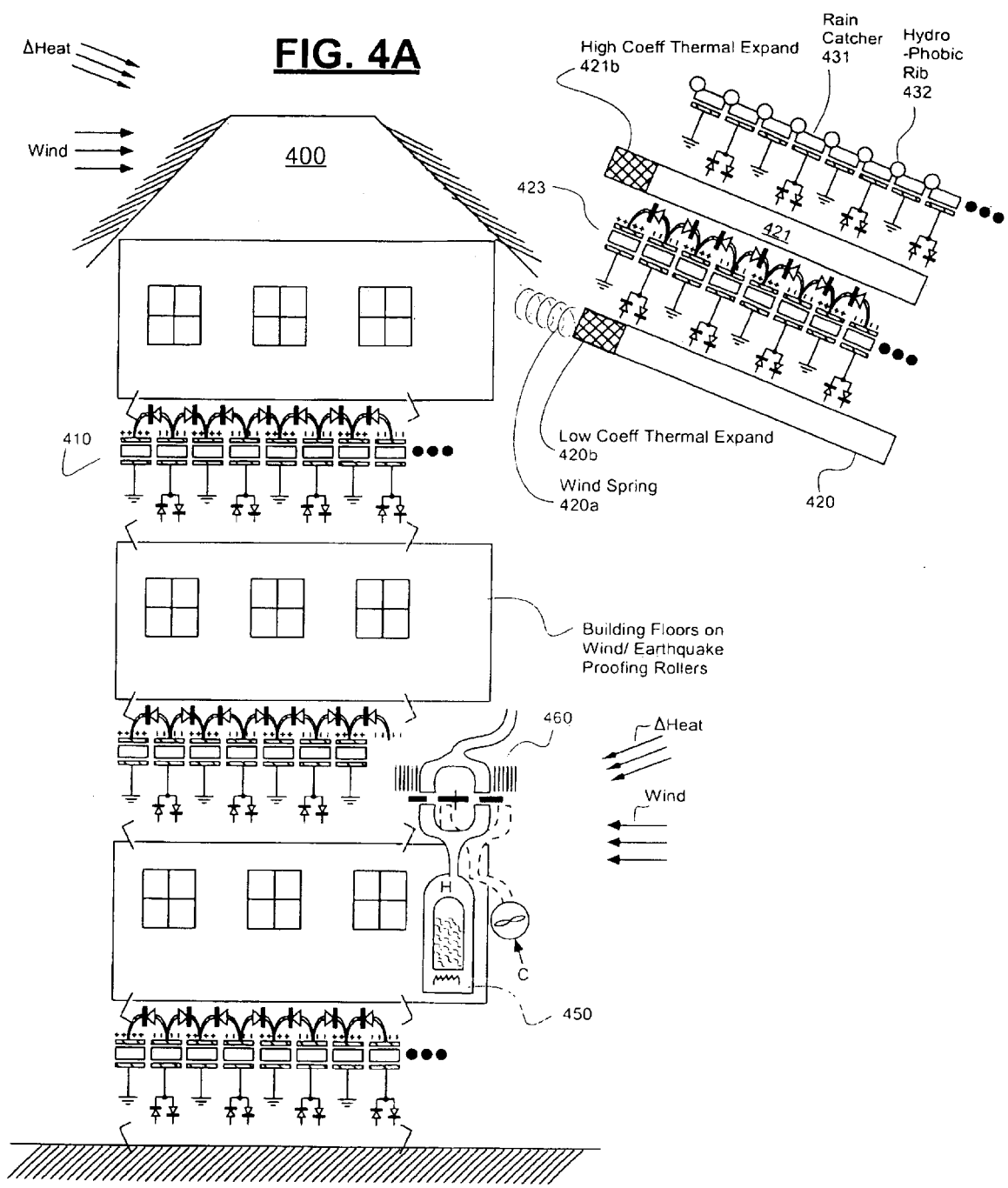

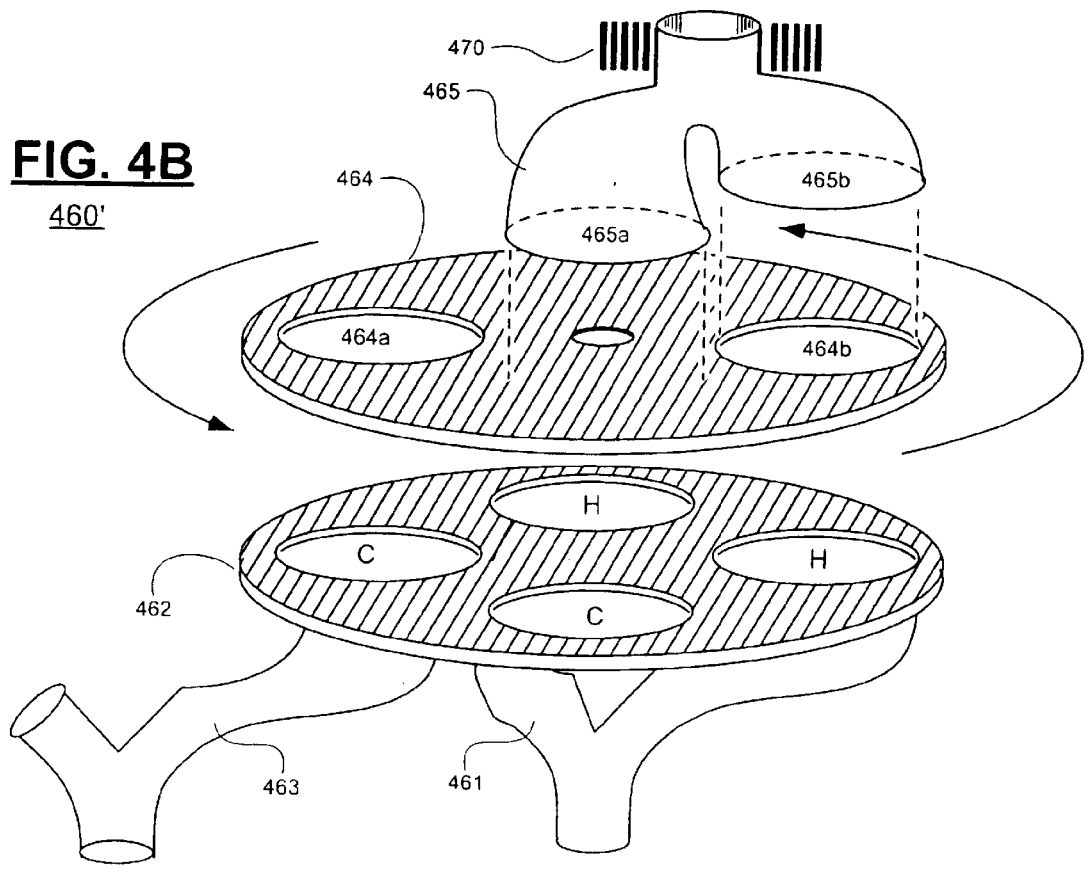
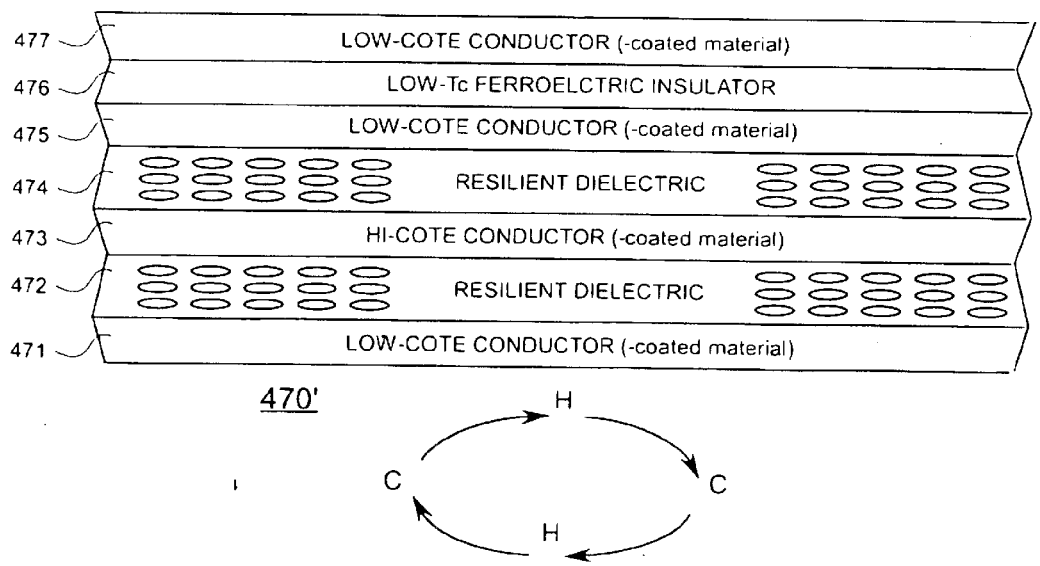

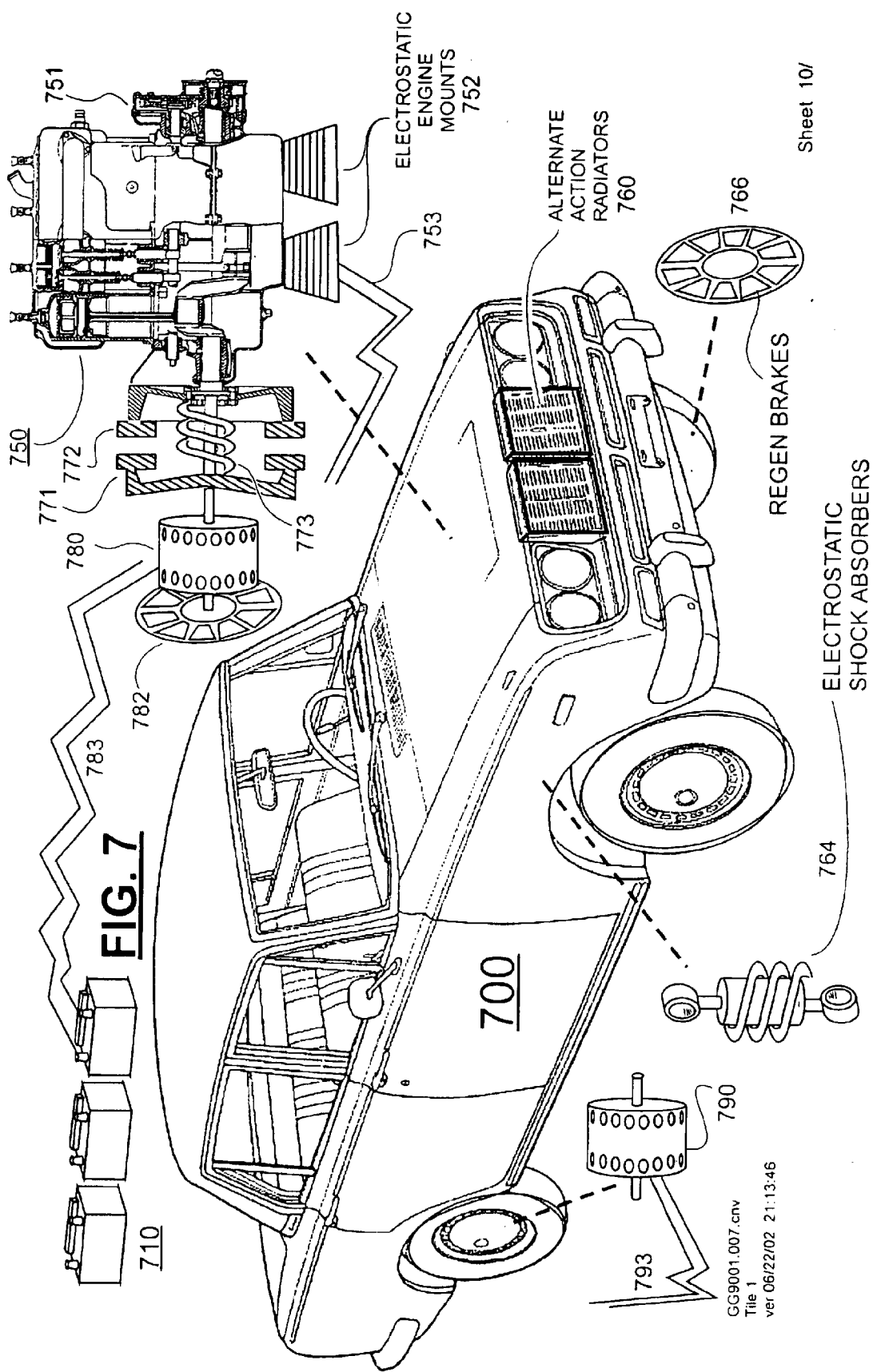

900

ELECTROSTATIC ENERGY GENERATORS AND USES OF SAME

CROSS REFERENCE TO PATENTS

The disclosures of the following U.S. patents are incorporated herein by reference:

(A) U.S. Pat. No. 4,151,409 O'Hare (1979): "Direct current variable capacitance electric generator";

(B) U.S. Pat. No. 4,127,804 Breaux (1978): "Electrostatic energy conversion system";

(C) U.S. Pat. No. 4,087,735 O'Hare (1978): "Solar electric generation using variable capacitors";

(D) U.S. Pat. No. 5,640,042 Koscica (1997): "Thin film ferroelectric varactor";

(E) U.S. Pat. No. 5,162,972 Gripshover (1992): "Liquid filled variable capacitor";

(F) U.S. Pat. No. 4,991,366 Teramura (1991): "Vibration isolating device";

(G) U.S. Pat. No. 5,268,433 Ikeno (1993): "Silicone composition and a highly damping hardened silicone material";

(H) U.S. Pat. No. 4,527,365 Yoshizawa (1985): "Earthquake insulating bearing assembly";

(I) U.S. Pat. No. 6,223,483 Tsukagoshi (2001): "Vibration damping mechanism and anti-earthquake wall material";

(J) U.S. Pat. No. 6,054,651 Fogel (2000): "Foamed elastomers for wafer probing applications and interposer connectors";

(K) U.S. Pat. No. 5,923,522 Sajna (1999): "Capacitive switch with elastomeric membrane actuator";

(L) U.S. Pat. No. 6,054,071 Mikkelsen, Jr. (2000): "Poled electrets for gyricon-based electric-paper displays";

(M) U.S. Pat. No. 6,001,299 Kawabe (1999): "Process and apparatus for manufacturing an electret article";

(N) U.S. Pat. No. 6,127,812 Ghezzo, (2000): "Integrated environmental energy extractor";

(O) U.S. Pat. No. 4,054,826 Wahlstrom (1977): "Method and apparatus for charging batteries using variable capacitors";

(P) U.S. Pat. No. 4,622,510 Cap (1986): "Parametric electric machine";

(Q) U.S. Pat. No. 5,615,041 Field (1997): "Fabrication of patterned poled dielectric structures and devices";

(X) U.S. Pat. No. 5,084,801 El-Hamamsy (1992): "Liquid crystal variable capacitor and high intensity discharge lamp ballast employing same";

(Y) U.S. Pat. No. 5,050,434 Demisch (1991): "Capacitive humidity sensor"; and (Z) U.S. Pat. No. 5,631,624 Kanba, et al. (1997): "Dielectric ceramics and electronic parts using the same".

CROSS REFERENCE TO PUBLISHED US APPLICATIONS

The disclosures of the following U.S. patent applications are incorporated herein by reference:

(a) U.S. Pat. App. 20020048143 A1 by Lee, Young-hee; et al. published Apr. 25, 2002, entitled Supercapacitor Using Electrode of New Material and Method of Manufacturing the Same;

(b) U.S. Pat. App. 20020068170 A1 by Smalley, Richard E.; et al. published Jun. 6, 2002, entitled Polymer-wrapped Single Wall Carbon Nanotubes; and (c) U.S. Pat. App. 20020008956 A1 by Niu, Chun-Ming, published Jan. 24, 2002 and entitled Fibril Composite Electrode for Electrochemical Capacitors.

FIELD OF DISCLOSURE

The present disclosure of invention relates generally to the generation of electrical energy from various supplies of energy, such as but not limited to, naturally renewable sources of energy.

The disclosure relates more specifically to use of electrostatic mechanisms for extracting electrical energy from randomly variable, and typically persistent, sources of other energy (e.g., ocean waves) or from relatively nonvariable sources of other energy (e.g., solar heat).

RESERVATION OF EXTRA-PATENT RIGHTS AND RESOLUTION OF CINFLICTS

After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, the present disclosure controls. If such incorporated disclosures conflict in part or whole with one another, then to the extent of conflict, the later-dated disclosure controls.

DESCRIPTION OF RELATED ART

When rapid and consistent production in real time of large amounts of electric energy is desired, the magnetic dynamo has historically reigned as one of the best sources for generating such energy on a mass production basis. In unique places such as Niagra Falls (U.S.A.) nature offers thunderous and abundant flows of water for surging against the fast spinning turbine blades of man made hydroelectric energy plants. The water-driven turbines typically spin rotors of magnetic dynamos at consistently high velocities and cause wire windings in the dynamos to swiftly cross through magnetic lines of flux (or vice versa). Large currents of electricity can be generated in this way at high voltage.

In places where nature is not so generous as to provide a persistent supply of easily obtainable, high speed power like that of a year-round waterfall or that of consistent wind power or that of another consistent and like form (e.g., geothermal), then fossil fuels (or other nonrenewable sources such as nuclear fission ones) may be consumed to produce steam and heat. The high-temperature steam typically flows into turbines and drives their bladed shafts to desired rotary velocities. The turbines then turn the rotors of magnetic generators (dynamos) and thereby produce electric energy. Waste heat is dissipated into the atmosphere or into a nearby body of water as the exhaust steam (or other fluid) is converted back to a low temperature working fluid.

In some locations, where the winds happen to regularly blow at speeds of 30 miles per hour or faster, and in a persistent direction, propeller farms (e.g., horizontal axis wind turbines) can be constructed to capture nature's renewable power and convert it by way of magnetic generation into electric power. On days when the wind slows to below a critical velocity or comes only sporadic bursts, the propellers often sit idle, unable to spin their dynamos at the necessary persistent speed for producing adequate voltage over an economically feasible length of time. In other words, although some amount of wind may be present, its energy is left untapped because it is being presented at below a system-critical velocity (e.g., about 30 MPH for horizontal-axis wind-driven propeller systems) and/or it is blowing in the wrong direction (e.g., an updraft instead of a cross wind).

It can be seen from the above introductory examples that dynamo-based energy production has the drawback of needing a steady, high velocity, and often unidirectional power source. Another drawback (not yet mentioned) is that the ferromagnetic materials conventionally used (e.g., Fe, Ni, Co and alloys thereof) in magnetic dynamo-based energy production are of relatively large mass density and are thus heavy. If fossil fuels or the like are used for energy generation, then waste heat and/or pollution of other forms are typically produced. It would be advantageous to be able to produce electric energy (even if it is supplemental energy rather than large amounts of primary energy) from renewable and/or waste sources of energy, even where such sources are not consistent with respect to their velocity, frequency and/or regularity.

Introductory Summary

Structures and methods may be provided in accordance with the present disclosure of invention for overcoming one or more of the above-described problems.

(A) More specifically, in accordance with one aspect of the present disclosure, electrostatic techniques are provided for usefully converting random and/or irregular and/or slow motions (and/or thermal fluctuations) into stored electrical energy. Such random and/or irregular and/or slow motions (and/or thermal fluctuations) may be found in abundance in a wide variety of environments. Recognition of these environmental opportunities is often limited by lack of open-minded awareness. The examples given here are meant to be nonlimiting suggestions that will enable those skilled in the art to recognize many alike situations where similar strategies for cost-effective energy capture may be utilized.

By way of an introductory example, consider the various types of random and/or irregular and/or slow motions (and/or thermal fluctuations) that may be found at the ocean or at a beachfront. These may include: (1) wave motion; (2) water currents (e.g., undertows); (3) transverse wind; (4) rising and falling air thermals; (5) the rise and fall of the tides; (6) temperature differences between air, water, and/or different layers below the surface of the water; (7) solar energy changes that may occur as sunshine is cutoff and turned back on by passing clouds or other effects; and (8) back-reflected solar energy that wave-fluctated water reflects back up to the sky. Consider also ground vibrations that may be found in many industrialized locations such as within congested cities or along roadways that are frequented by heavy trucks. The vibrational noise from these can also constitute an example of random and/or irregular motions. (It should become apparent later below that environmental noise such as vibrational noise and thermal fluctuations may be used to recharge emergency battery supplies such as for emergencies flashlights, fire alarms, etc.)

Even when there are no, naturally-provided energy fluctuations, there will be times when it is worthwhile to artificially induce such fluctuations in order to reap the benefits disclosed herein. For example, on a hot windless desert day, one might choose to employ an oscillating light shutter (e.g., a solar Ferris wheel, radiometer, etc.) or other such means (e.g., oscillating balloons, periodically tilting mirrors, as shall be described below) for inducing variation in the amount of solar radiation or other energy that is being coupled to an electrostatic energy generator in accordance with the present disclosure. More on this later.

(B) In accordance with a second aspect of the present disclosure, electrically charged particles of opposite charge types are condensed and temporarily trapped (substantially trapped) in adjacent but dielectrically separated positions from one another; and then urged to higher levels of energy relative to one another by captured forms of available energy such as random and/or irregular and/or slow motions (and/or thermal fluctuations) so that the relative energy of the trapped particles is increased (generally by less than astronomical proportions). An example of such action is the trapping of opposed electrical charges respectively in opposed plates of a variable capacitor and the reduction of the capacitance of the variable capacitor (e.g., to a close to null amount) by using one or more of various means which keep the condensed charge trapped while decreasing capacitance, such as by increasing the separation between the capacitor plates, and/or such as altering the dielectric constant of a dielectric material provided between the plates, and/or reducing the effective area of the opposed capacitor plates (e.g., where one of the plates has a liquid form). More generally, electric charge is attracted into a charge-trapping member (e.g., plate or finger of a variable capacitor), the attractive force is reduced or removed or reversed (to be a repulsive force) while the charge remains so trapped, and as a result the energy level of the trapped charge increases. The condensed and trapped charge is then released (purged, evaporated) from the charge-trapping member and directed to flow into a purged-charge collecting element of raised potential, such as a chargeable battery. The collected charge may then be used for performing useful work. in one embodiment, at least part of the evaporated (purged) charge is directed to a charge storing and donating means which donates such charge for further condensation, trapping, energy raising, and purging so that the purged charge is recycled.

One possible way of viewing the foregoing is that a variable capacitor means is provided to act sort of as a squeezable and de-squeezable sponge which is operatively coupled to an inclined or stepped energy plane having upper and lower energy pools. A lower part of this visualizable sponge is selectively moveable to dip into and to absorb charge (analogous to absorbable liquid) from the lower-energy, donor pool. An upper part of this visualizable sponge is selectively coupleable to the relatively higher-energy acceptor pool so that fluid (electrical charge) previously absorbed into and stored in the sponge can be squeezed out into the higher-energy acceptor pool. During a priming phase, the sponge is in its squeezed (compressed) state and it is lowered into contact with the lower-energy, charge-donor pool and it is then decompressed (expanded into a charge absorbing state) so as to absorb the low-energy charge. Then an external energy source (e.g., nonelectrical) is used to raise the charge-storing sponge away from contact with the lower pool (thereby raising the energy level of the trapped charge) and to squeeze the energy-increased charge out into the higher-energy acceptor pool. This is the purging phase. (Some leakage of absorbed fluid back to the lower pool might occur here.) At the same time and/or after the squeezing, the squeezed-out charge is returned to the donor pool so as to replenish the donor pool. The sponge is then dipped again into the lower-energy pool for soaking up further charge and transferring the absorbed charge into the higher-energy pool. The absorb and squeeze-out steps are repeated over time. The foregoing is a way of visually understanding part of what is disclosed herein. The visualization is not intended to alter or detract from the more concrete examples given herein.

More specifically, in accordance with one detailed aspect of the present disclosure, a structure is provided that comprises: (a) priming means for condensing a priming amount of charge (an invested amount of charge) into a variable capacitor means; (b) capacitance reducing means that uses an external form of energy to reduce the electrostatic condensation capacity of the variable capacitor means in a charge-containing manner and to thereby increase the energy of the trapped charge; (c) charge releasing means for releasing the more energized charge from the variable capacitor means at a somewhat controlled voltage level that is higher than the voltage at which the charge was condensed into the variable capacitor means; (d) charge collecting means for collecting the more energized charge at its somewhat higher voltage level; and (e) charge reinvesting means for directing at least part of the collected charge to the priming means for reuse as priming charge.

Other aspects of the disclosure will become apparent from the below detailed description.

BRIEF DESCRIPTION OF THE DRAWINGS

The below detailed description section makes reference to the accompanying drawings, in which:

FIG. 2C is a combined schematic diagram and perspective sectional side view showing an implementation of another trapped-charge, attraction-repulsion type, variable capacitor means in accordance with the present disclosure;

FIG. 3D is a side view of yet a further CIPR system which may be used to energize one or more variable capacitor means.

FIG. 4A is a side sectional view of a building that is outfitted with one or more charge-investing, profit recapturing, systems in accordance with the present disclosure;

FIG. 4B is an exploded apart perspective view of a temperature oscillating valve that may be used in accordance with the present disclosure;

FIG. 4C is a cross sectional view of a temperature modulated variable capacitor means that may be used in accordance with the present disclosure;

FIG. 7 is a schematic diagram of a hybrid automobile that has one or more charge-investing, profit recapturing systems integrated therein for opportunistically converting vibrations, waste heat and/or other waste energies into electrical energy;

DEFINITIONS AND CAVEATS

Figure 1A:
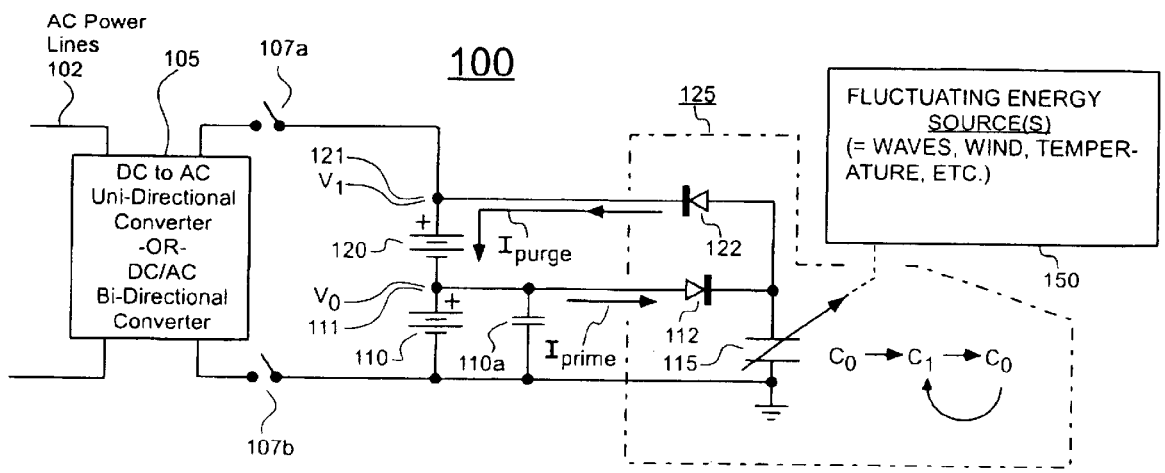
FIG. 1A is a schematic diagram illustrating a simple, first charge-investing, profit recapturing (CIPR) system in accordance with the present disclosure.

New technologies often benefit from the coining of new terminology that describes novel characteristics or from the re-use of old terminology in a slightly different way. Variable capacitors are known in the prior art and may include those where additional capacitors are switched into and out of parallel connection with one or more other capacitors to thereby effect a change of total charge condensing capability. However, such a switched-into and out-of parallel interconnection of capacitors often merely re-distributes charge rather than increasing or decreasing the energy level of trapped charge. When used herein, the term, "variable capacitor" is to be understood as referring to the kind wherein the aggregate, potential energy of trapped charge is increased or decreased by virtue of the change of the net charge-attracting forces within the variable capacitor. The aggregate, potential energy of trapped charge may be additionally or alternatively increased or decreased by virtue of a change of charge-repelling forces within a variable capacitor means that is provided in accordance with the present disclosure. Thus, variable capacitor means as used herein may include structures that rely on electrostatic repulsion (the reverse of charge condensation) in place of, or in addition to electrostatic attraction (charge condensation) as will further become apparent below.

DETAILED DESCRIPTION

The idea of separating the plates of a capacitor while charge is trapped on its plates is notoriously old and may be found in elementary physics books. It is also well known that the relationship between attractively-stored charge (Q), voltage (V), and electric capacitance (C) may be expressed as, $Q=VC$ and that the electrostatic energy in a charged capacitor may be expressed by: $w=\frac{1}{2}*C*V^2$. Numerous electrostatic generating machines have been built wherein charge is trapped on some form of conveyor (e.g., a conveyor belt or wheel) and moved away from its point of trapping so as to thereby increase the potential energy level of the trapped charge by astronomical proportions. Voltages can climb to the point where an electric arc discharges across air for the purpose of providing entertainment. These various kinds exploitations of the effect can be characterized as being hampered by greed and lack of patience. It is all too tempting to want to get a big output for essentially nothing being invested. An example of the latter is that of obtaining initial charge by rubbing glass on wool and wanting to see quick, astronomical gains in final voltage, to the point where electric arc discharges occur immediately before one's eyes. (See for example the above-cited U.S. Pat. No. 4,127,804 by Breaux, Nov. 28, 1978 which suggests providing a vacuum-like environment to prevent discharge between rotating capacitor vanes that sport very high voltages. See also U.S. Pat. No. 4,087,735 by O'Hare May 2, 1978 which seeks to rotate variable condensers at high speed through a light source. More importantly, see U.S. Pat. No. 6,127,812 to Ghezzo, et al. Oct. 3, 2000 which relies on small reverse current through diodes for trickle charging the capacitor plates of miniature variable capacitors to a voltage level near the energy source voltage.)

The present disclosure follows somewhat different schemes by being willing to invest more energy in a more substantial way and at the opportunistically appropriate time to quickly charge (prime) the plate means of a variable capacitor means so they can be ready to opportunistically respond to applied external energy, and by being modest about the amount of energy profit that is made per cycle, and sometimes by further being patient about how long each cycle may take.

FIG. 1A is a schematic diagram of a first Charge-Investing and Profit-Recapturing, first system 100 (CIPR system) in accordance with the present disclosure. Elements 102,105, 107*a–b* are ancillary components that may be advantageously combined with the main part of the first CIPR system 100, where the main part is defined generally by the other illustrated parts of FIG. 1A. When switches 107*a–b* are closed, AC power (e.g., 60 Hz) may be imported into the system from power lines 102 and converted to DC power by way of the DC/AC bidirectional converter 105 for subsequent storage in a priming battery means 110 and/or in priming-charge storing capacitor 110*a*. Part of the imported power may also be routed for storage within a purge-collecting battery means 120. This may be done for example at times when AC electrical power is abundant (e.g., low priced, such as around or after midnight) and there is expectation that AC electrical power will be scarcer (e.g., higher priced) and therefore more needed in the near future daytime such that it is economically advantageous to store converted energy in the DC battery means 110, 120 and withdraw it, and convert it to AC at a later time. However, the primary thrust of this disclosure is not directed to overnight storage of electrical power but rather to the idea that electrical energy should be generated from energy obtained from nonelectrical energy sources (150), temporarily stored in DC battery means such as illustrated at 110, 120 and then used for performing electrical work.

In an alternate embodiment, the power network interface means 105 can be a unidirectional, DC to AC converter that merely withdraws energy from the battery means 110, 120 and supplies it to a power sharing network such as represented by AC power lines 102. In yet another alternate embodiment, means 105 can be a unidirectional, AC to DC converter that supplies replenishment energy to overcome a minor, charge depletion problem that will be discussed later below (e.g., in regard to FIG. 1B). In yet a further embodiment, means 105 can be a bidirectional, DC to DC converter that can be used to controllably define the values of one or both of first and second voltage levels $V_0$ and $V_1$, and/or to supply replenishment energy to battery means part 110, and/or to withdraw surplus energy from combined battery means 110/120 for output to an electrical power sharing network (102).

One or more parts of the DC battery means 110, 120 may be removably installed within appropriate battery receptacle means (not shown) of system 100 if desired; or battery means 110, 120 may be installed for relatively long-term use within the charge-investing, profit recapturing, first system 100 as may be appropriate for a respective use of the CIPR system 100. The battery means 110, 120 may be used for storing electrical energy and for maintaining somewhat constant (but they do not have to be fixed, as shall become evident) respective first and second, reference voltage levels, $V_0$ and $V_1$ (where $|V_1|>|V_0|$) at respective first and second nodes 111 and 121. Accordingly, either or both of the respective first and second parts, 110, 120 of the battery means may be comprised of rechargeable voltage sources such as: lead-acid batteries, NiCd (Nickel Cadmium), Lithium-ion, Ni-Mh (Nickel Metal Hydride), Rechargeable Alkaline, and/or other such electrochemical energy storing devices. The respective first and second parts, 110 and 120, may additionally or alternatively each include a high-capacitance, relatively nonvariable capacitor (e.g., more than 999 microFarads, >1000 μF) and/or so-called supercapacitors (e.g., including those that may be implemented with nanotube technology). An example of such a high-capacitance, relatively nonvariable capacitor is shown at 110*a* and may be understood as supplementing and/or at times replacing or fully replacing the priming-current supplying function and/or the purged-current recapturing function of battery means 110. Fuel cells or other types of electrochemical or mechanical voltage-maintaining means (e.g., flywheels) or other voltage-maintaining means (e.g., photovoltaic cells—see FIG. 5) may be used within the first battery means. The first battery means (110)—which as shall be seen, provides a priming charge—may additionally or alternatively comprise a non-rechargeable voltage source such as a fuel cell or conventional alkaline battery and/or a photovoltaic solar cell array and/or an inductive pickup which collects energy from ambient, fluctuating electromagnetic fields and deposits the collected energy into supplemental capacitor 110a and/or into a variable capacitor means 115. For purpose of initial simplicity, the first battery means part, 110, will described as if it is merely a rechargeable voltage source, as is the second battery means part, 120; and the supplemental priming capacitor 110a will be ignored.

The respective first and second, voltage-maintaining nodes 111 and 121 may be coupled via current routing means such as the respectively illustrated, priming-current directing diode 112 and the purge-current directing diode 122 to the variable capacitor means 115. Again, for purpose of initial simplicity, the current routing means are described as simple diodes. It is to be understood however that the present disclosure contemplates more complex current routing means such as those using photo-transistors or other controllable gating means for routing currents at appropriate times between desired nodes.

The capacitance of the variable capacitor means 115 changes from a relatively large, $C_0$ value to a substantially smaller, $C_1$ value in response to a capacitance-modulating energy that is supplied to the capacitor means 115 from one or more external energy sources 150. The specific capacitance values, $C_0$ and $C_1$ do not have to be precisely known or controlled. Similarly, as already explained, the specific values of $V_0$ (the voltage of the priming voltage source 110) and of the difference, $V_1-V_0$ (the voltage of the second voltage source 120) also do not have to be precisely known or controlled. It is worthwhile though, to assure that $V_1$ does not exceed the breakdown voltage of the variable capacitor means 115 in its minimized capacitance mode ($C_1$ mode), and that the potential difference, $V_1-V_0$ does not substantially exceed the reverse-bias breakdown voltages of each of diodes 112 and 122. Each of diodes 112 and 122 should have a relatively negligible reverse bias current leakage when respective voltages $V_0$ and $V_1$ remain within normal operating ranges. If desired, one or both of diodes 112 and 122 may be designed to break down if respective voltages $V_0$ and $V_1$ exceed the design-specified operating voltage ranges.

It may be readily appreciated from FIG. 1A (and the above introduction) that a priming current, $I_{prime}$ is to flow from the first voltage source 110, through first diode 112 and into the variable capacitor means 115 during the high-capacitance, $C_0$ mode of the latter to thereby deposit or condense and investment charge into the variable capacitor means 115 and raise the voltage across means 115 to approximately the $V_0$ level. The second diode 122 is reverse biased during this priming phase (charge investment phase). It can be further appreciated from FIG. 1A that a charge purging current, $I_{purge}$ (also referred to as a charge expulsion current) is to flow out of the variable capacitor means 115 and through the second diode 122 and into the series circuit formed by the first and second voltage sources 110/120 as the capacitance of variable capacitor means 115 is reduced and the voltage across the changing capacitor means 115 rises to approximately $V_1$ (plus the forward threshold drop across diode 122). The first diode 112 is reverse biased during this charge-purging phase. (If the supplemental priming capacitor 110a is present and the main priming battery means 110 is not rechargeable, then at least some of the charge purging current, $I_{purge}$ should flow into the supplemental priming capacitor 110a during the charge expulsion phase so as to thereby recycle part of the profit charge for subsequent investment.)

Stated more broadly, what is shown is a method for producing electrical energy from other energy supplied by outside energy sources (150) where the energy producing method comprises the steps of: (a) condensing an investment amount of charge ($Q_0$) into a first variable capacitor means (115) so as to establish a first voltage ($V_0$) across the first variable capacitor means; (b) trapping the condensed electrical charge ($Q_0$) in the first variable capacitor means; (c) while the condensed electrical charge is trapped, using the nonelectrical energy source (150) to decrease [and/or reverse as shall be seen later below] the charge condensing abilities of the first variable capacitor means so as to establish a second voltage ($V_1$) across the first variable capacitor means, where the second voltage ($V_1$) is substantially greater than the first voltage ($V_0$); (d) releasing the trapped electrical charge from the first variable capacitor means after the second voltage ($V_1$) is established across the variable capacitor; and (e) directing (122) at least part of the released/purged charge to a purged-profit charge capturing means (120) and to an investment charge recapturing means (110) where the latter means 110 can then re-invest the directed charge as condensed investment charge ($Q_0$) back in the first variable capacitor means (115)—and/or in another variable capacitor means as shall be seen later below.

Energy stored in the variable capacitor means 115 when the latter means is in its primed, high-capacitance mode, $C_0$ may be expressed, at least approximately, per the following equation Eq. 1:

$$w_0 = \tfrac{1}{2} * C_0 * V_0^2 = \tfrac{1}{2} * Q_0 * V_0 \qquad \{\text{Eq. 1}\}$$

Just as the variable capacitor 115 is shifting toward its low-capacitance mode, $C_1$, and voltage across capacitor means 115 is just below $V_1$ (meaning diode 122 is about to switch into its forward conduction mode), the energy stored in the variable capacitor 115 can be approximated per the following equation Eq. 2:

$$w_1 = \tfrac{1}{2} * Q_0 * V_1 \qquad \{\text{Eq. 2}\}$$

The reason that charge is still expressed as $Q_0$ in equation Eq. 2 is because substantially all of that charge continues to remain trapped in the variable capacitor means 115 at this stage. Diode 122 has not yet become forward biased. As the variable capacitor means 115 completes shifting into its low-capacitance mode, $C_1$, and voltage across the capacitor means 115 begins to exceed $V_1$ (meaning diode 122 is now switched into its forward conduction mode—a near-zero threshold drop is assumed here to simplify the calculations), most of the charge will be squeezed out of (purged from) the variable capacitor means 115, directed through diode 122, and into the voltage source series formed by batteries 120/110. The first voltage source 110 can (if it is rechargeable) recoup all or a substantial part of the priming charge, $Q_0$ that it donated during the priming cycle (a close to perfect discharge and charge efficiency is initially assumed to simplify calculations here and the supplemental priming capacitor 110a is ignored). The second voltage source 120 obtains a charge profit of $Q_0$ during the charge purging (expulsion) cycle since the second voltage source (e.g., chargeable battery) 120 did not donate any substantial amount of charge during the priming part of the cycle. The energy gain by the combined, voltage source series (e.g., rechargeable battery series) 120/110 can be approximated as indicated by the following equation Eq. 3:

$$\Delta w_{10} = 1/2 * Q_0 * (V_1 - V_0) \qquad \{\text{Eq. 3}\}$$

For purpose of further simplification, let $V_1 = k * V_0$ where k>1. In that case, the above, per-cycle, energy profit approximation equation, Eq. 3 can be re-written as indicated by the following equations Eq. 4a–4b:

$$\Delta w_{10} = 1/2 * Q_0 * V_0 * (k-1) \quad \{Eq. \ 4a\}$$

$$= 1/2 * C_0 * V_0^2 * (k-1)$$

Energy profit approximation equation, Eq. 4b provides a few valuable lessons. Energy profit per cycle increases as the square of $V_0$. Thus having a larger $V_0$ value (e.g., greater than about 9 to about 18 volts, and better yet, greater than about 100 volts, and even better yet if the components can handle it, greater than about 500 to about 1000 volts) is more beneficial than having a very large $V_1$ (or in other words, a k factor that is very much greater than unity). The more practical approach is to have a k factor that is much less than about 1000, for example a k factor of about 2 to about 11, or within that range of about 3 to about 9, or yet more specifically of about 5 to about 7.

Also, having a larger $C_0$ value (e.g., greater than 100 microFarads in the priming mode, and better yet, greater than about 1000 microFarads in the priming mode) is as equally beneficial as is having a larger $V_1$ value. Diodes 112 and 122 each should be able to withstand the reverse bias stress of $V_0*(k-1)$. Thus, making k astronomically large is not a good idea because that can damage diodes 112 and 122. Using a very large k value is an example of letting greed blind one's eyes to long term benefit and reliability. The real question is how to economically build a variable capacitor means 115 that has a relatively high $C_0$ value, that can withstand a relatively high $V_0$ value in the $C_0$ mode, and can interact effectively with a given one or more fluctuating energy sources 150 so that good energy gain is obtained long term and in a reliable manner, over many charge priming and purging cycles. Despite what is stated here, it is within the contemplation of this disclosure to additionally or alternatively have two or more, i.e. tens, hundreds, millions, etc., microscopically-sized copies of the combination 125 defined by variable capacitor means 155 and at least one if not both of diodes 112 and 122, and optionally including supplemental capacitor 110a all connected as shown to the $V_0$ node 111 and to the $V_1$ node 121 with each such combination 125 being optionally driven by its own independent energy source 150 and/or with plural ones of such micro/nano-sized combinations (125=115 plus 112 and/or 122 and/or 110a) being driven by shared energy sources 150.

Various designs for the variable capacitor means 115 will be explored below. Nothing herein prevents the capacitor means 115 from taking the form of a conventional, rotatable vane design with air or mica dielectric being used between the capacitor plates. Nothing herein limits the size of such variable capacitor means 115 unless expressly stated. It can be a large and integral part of a major suspension bridge that carries trains and trucks, and/or it can be constructed of nanofibers (e.g., single or multi-walled nanotube fibers having diameters of no more than a couple hundred atomic diameters). Nothing herein limits one or more of opposed capacitors plates and/or the dielectric to being solid. The dielectric and/or one of the capacitor plates can be liquid. For example, the liquid element(s) can be situated so as to flow into and out of operative capacitive coupling with electrically-conductive nanofiber fingers.

It is to be understood also, that ultimately the charge profit made by the second voltage source 120 is to be drained at least partially from that source 120 and used for carrying out useful work. (Part of the drained charge can be returned to the first voltage source 110 to replenish energy it loses as a result of less than 100% efficient discharge and re-charge cycles.) A same priming-charge donor battery means and/or purged-charge collecting battery means can be coupled in parallel to plural variable capacitor means and their respective current directing diodes, where each of the plural variable capacitor means is allowed to independently switch between its charge condensing and charge purging modes. Thus some of the plural variable capacitor means could be generating electrical energy from one kind of source while others are dormant due ambient conditions, and the roles of active and dormant can change as ambient conditions change.

It is worthwhile to now note some of the hints schematically provided within the representation of the fluctuating energy source 150. The fluctuating energy that cycles capacitor means 115 between its high-capacitance, $C_0$ mode, and low-capacitance, $C_1$ mode can come from ocean waves, or from the wind or even from temperature variations or combinations of these. With respect to the last item, temperature-constrictive monomorphs, bimorphs (e.g., bimetals) or the like may be used to move and/or deform a capacitor plate and/or a dielectric and thereby modulate the capacitance of the variable capacitor means 115. Because velocity is not crucial, the slow-moving piston of a Stirling engine can provide part or all of the external energy, while waste heat from the engine may provide more. Also with respect to the last item, temperature-variable dielectric materials (e.g., ferroelectric materials with appropriate $T_c$'s and/or liquid crystals) may be used to alter the capacitance of the variable capacitor means 115. More on this below. Pressure-sensitive dielectrics such as dielectric elastomer films (e.g., 3M VHB 4910 acrylic: dielectric constant approx. 4.8) may also be used.

It is further worthwhile to now note that the voltage output, $V_1$ of the charge purging mode ($I_{purge}$) is generally independent of the frequency, speed, periodicity, strength, etc. of the fluctuating energy source(s) 150. Of course, $V_0$ may be varied to compensate for the weakness or strength of the present energy source(s) 150 at various times and microcomputers or other intelligent like mechanisms may be employed to determine when and/or to what extent. Details on this are outside the purview of the present disclosure. The important thing to be noted here is that temperamental and/or slow-changing energy sources such as ocean waves, ocean currents, tides, turbulent water streams, winds, earthquake tremors, and so forth can be easily tolerated by the illustrated CIPR system 100 (Charge-Investing and Profit-Recapturing system 100) so long as the variable capacitor means does not self-discharge while waiting in a primed state. There is no requirement for winds in excess of 30 MPH or a continuous flow in a particular direction. Capacitance varying parameters can additionally or alternatively include humidity and/or barometric pressure.

Figure 1B:
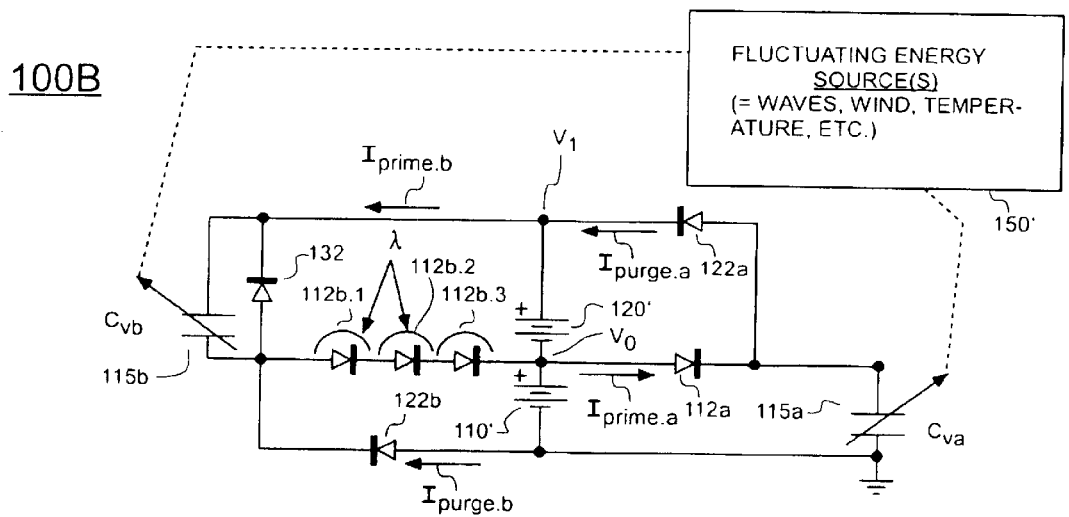
FIG. 1B is a schematic diagram illustrating a slightly more advanced, second charge-investing, profit recapturing system which solves a donor-discharge problem which may be present in the system of FIG. 1A.
Figure 2A:
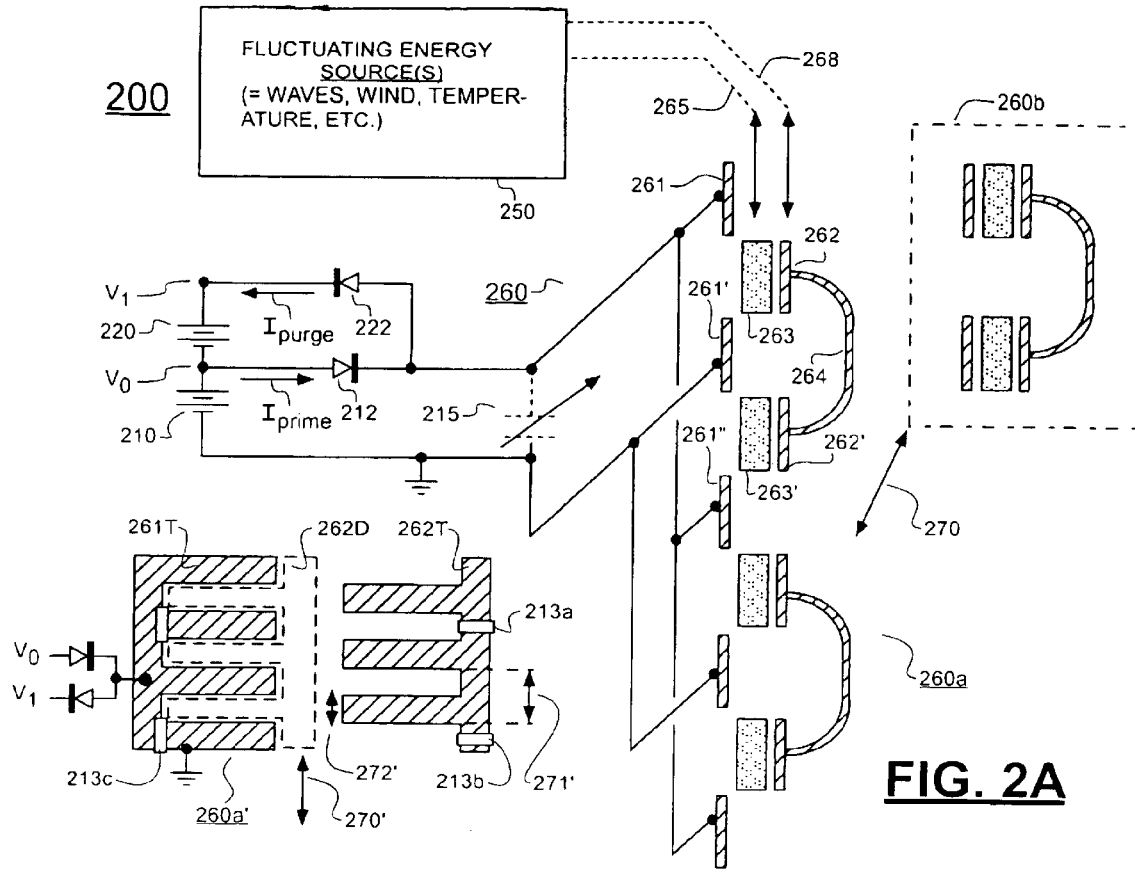
FIG. 2A is a combined schematic diagram and cross sectional side view and planar top view showing a first implementation of a variable capacitor means in accordance with the present disclosure.

Referring to FIG. 2A (the charge replenishment aspect of FIG. 1B will be discussed later), a cross-section of a first, reciprocation-based, variable capacitor 260 is shown as being substitutable for the illustrated, generic variable capacitor means 215. Capacitor 260 comprises a first set of relatively stationary plate members, 261, 261', 261", etc. and a reciprocatably movable set of second and opposed plate members, 262, 262', etc. A reciprocatably movable set of high-dielectric constant, insulating members 263, 263', etc. (solid members and/or fluid bubbles) may be interposed between the first and second sets of plate members in place of a purely air or vacuum gap. The insulating dielectric members 263, 263', etc. may move independently of, or in unison with the second plate members, 262, 262', etc. In an alternate embodiment, the insulating members 263, 263', etc. may be respectively attached to respective ones of the of stationary plate members, 261, 261', etc. while only the second plate members, 262, 262', etc. move. The high capacitance mode is shown at 260b while an opposed, relatively-minimal capacitance mode is shown at 260a; where reciprocation (270) between states 260a and 260b is driven by one or more, external energy sources. Reciprocation drivers 265 and 268 may be independent of one another and may be powered by different kinds of mechanisms. One could be wind-driven for example while the other is coupled to a temperature-modulated bi-metal or mono-metal or plastic with relatively high coefficient of thermal expansion (Hi-COTE, e.g., aluminum).

One possible planar view that may correspond with the cross-sectional view at 260 is shown at 260a in exploded-apart form. In operation, comb-shaped plate 262T is de-ploded into position 262D relative to comb-shaped plate 261 T and caused to reciprocate in direction 270' so as to switch between relatively-high and relatively-low capacitance modes. Items 213a–213c represent electrically-insulative mechanical connections for holding their respective comb-shaped plates 262T, 261T intact. (Note that alternating ones of the comb digits in comb-shaped plate 261T are respectively connected to ground (GND) or the $V_0/V_1$ diodes which is why they need to be electrically insulated from their immediately adjacent, fellow digits.) For good results, inter-digit pitch 271' should be about twice digit width 272', but it can be more, or less. A liquid lubricant of relatively high dielectric constant (e.g., greater than about 80) may be provided between the reciprocating plate members.

Figure 2B:
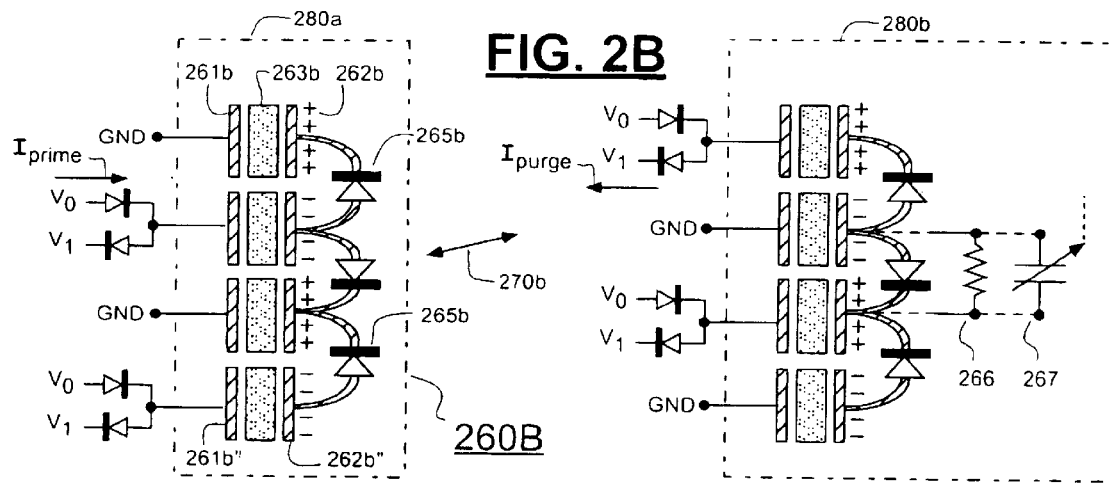
FIG. 2B is a combined schematic diagram with two cross sectional side views showing respective charge attraction and repulsion states of an implementation of a trapped-charge, attraction-repulsion type, variable capacitor means in accordance with the present disclosure.

Referring to FIG. 2B, another kind of variable capacitor means 260B (one that relies on electrostatic repulsion between like charges as well as on electrostatic attraction between opposite charges) is shown as being substitutable for the generic variable capacitor means 215. Capacitor means 200B comprises opposed, first and second conductive members such as 261b and 262b with an optional high-dielectric layer 263b being interposed between (in place of air). Diodes 265b are coupled both electrically and physically as shown across the second conductive members 262b so as to move with the second conductive members 262b and so as to create alternating regions of trapped positive and negative charge on alternating ones of the second conductive members 262b when the $V_0/V_1$ or ground (GND) connections are provided as shown at alternating ones of the first conductive members 261b. In illustrated state 280a, the $I_{prime}$ priming current moves through the series-connected capacitors and through the interposed diodes 265b which are attached to the second conductive members 262b so as to split the $V_0$ priming voltage across each pair of series-connected capacitors. Positive charge accumulates (condenses) on a secondary conductive member such as 262b. which in state 280a, is situated opposite to a grounded primary conductive member such as 261b. Negative charge accumulates on a secondary conductive member such as 262b", which in attraction state 280a, is situated opposite to the $V_0$-driven primary conductive member 261b".

When the variable capacitor means 260B of FIG. 2B switches (270b) into second state 280b (a charge-dispersing state, or anti-condensation state), the positively-charged, secondary conductors (e.g., 262b) come to be situated opposite to the $V_0$-driven primary conductive members (e.g., 261b") and the negatively-charged, secondary conductors (e.g., 262b") come to be situated opposite to the grounded primary conductive members (e.g., 261b). As a result of repulsion between like-charged particles, purge current $I_{purge}$ is urged to flow out through the purge diodes (e.g., 222 of FIG. 2A) and into the $V_1$ nodes. A high-resistance discharge path 266 or other ESD means (electrostatic discharge means) may be provided between the oppositely charged, secondary conductors (e.g., 262b, 262b") to prevent too large of a charge from building up between such members due to stray charge pick-up (e.g., dust particles). Additionally or alternatively, a further variable or invariable capacitor 267 may be coupled between the secondary I s plates as shown. If the supplemental capacitor 267 is of the variable kind and is modulated by an external energy source when the primary variable capacitor means 260B is in the charge-dispersal mode 280b then additional energy may be pumped into the system due to the changing amount of charge on plates 262b–b" causing corresponding change of charge density on opposed plates 261b–b".

An advantage of the combined attraction/repulsion based (condensation/anti-condensation) variable capacitor means 260B of FIG. 2B is that inter-digit pitch of the comb-shaped plate members can be much smaller than the comparable inter-digit pitch 271' of the attraction-only variable capacitor means of FIG. 2A. Thus, one can get roughly double the number of prime and purge cycles per unit distance of movement using the attraction/repulsion-based variable capacitor means 260B of FIG. 2B as compared to the attraction-only-based variable capacitor means 260 of FIG. 2A. Note also that direct electrical connections to/from the battery means ($V_1$/V/GND) can be made just to the stator-side conductors 261b–262b", thereby allowing the movable-side conductors 262b–262b" and their respective, charge-trapping diodes to move without need for direct electrical connections to/from the battery means ($V_1/V_0$/GND). The same is true for the stator plates 261–261" and movable plates 262–262" of FIG. 2A. Alternatively, two copies of layer 261b–261b" could be placed face to face and reciprocated. Each would see a switching of capacitively-coupled attraction and repulsion on its $V_0/V_1$ plate (261b") as the other side's GND and $V_0/V_1$ plates slide by.

In addition to, or as an alternative to trapping charge on the movable-side conductors 262b–262b" such as shown in FIG. 2B, it is also within the contemplation of the disclosure to use a moveable dielectric layer having charge trapped therein by way of ion implant or otherwise. Techniques for forming dielectrics with trapped charge (e.g., electrets) may be found in the art of making electrostatic air cleaning filters and electret-style microphones for example. FIG. 2C is a combined schematic diagram and exploded, perspective sectional side view showing an implementation 260C of another trapped-charge, attraction-repulsion type, variable capacitor means in accordance with the present disclosure. As seen, a checkerboard or other alternating pattern of conductive $V_{0/1}$ (e.g., 261c") and GND electrodes (e.g., 261c) is formed in a first layer (stationary layer) with appropriate connections to the battery means (e.g., 210, 220 of FIG. 2A). A corresponding checkerboard or other alternating pattern of polarized dielectric regions (e.g., 263c' and 263c") is defined in a second layer (a first reciprocateable layer) which is shown exploded away from the stationary, first layer. Moreover, a corresponding checkerboard or other alternating pattern of conductive, charge trapping electrodes (e.g., 262c, 262c''') is defined in a third layer (a second reciprocateable layer) which is shown exploded away from the first and second layers. It is to be understood that in operation, the second layer (263c, 263c', etc.) is sandwiched closely between the first and third layers and is optionally attached to the third layer (262c', 262c", etc.). The second reciprocateable layer (e.g., plates 262c, 262c''') plus charge trapping diodes such as 265c, 265c'') may reciprocate (268c) in unison with the reciprocation (270c) of the first reciprocateable layer (263c', 263c", etc.) or independently thereof. Appropriate liquid or other dielectric lubricants may be provided between the sandwiched layers. In one embodiment, reciprocation direction 270c of the first reciprocateable layer (dielectric layer) can be different from (e.g., orthogonal to) the reciprocation direction 268c of the second reciprocateable layer (trapped-charge plates layer). Although the reciprocateable layers are shown in planar form, it is within the contemplation of the disclosure to form them as coaxial tubular structures (circular or other cross section), or as concentric spherical structures, or in other cooperatively interactive formations as may be appropriate. The solid, dielectric second layer (263c, etc.) may be replaced by air or by liquid bubbles or by solid, nonpolarized sections.

Although not shown, it is to be understood that alternate packing patterns such as those possible with circles or isosceles triangles rather than squares may be used in place of the illustrated checkerboard patterns for the first and second capacitor plate layers and for the interposed dielectric layer. Each $V_{0/1}$ plate may have its own respective set of priming and purging diodes so that each such $V_{0/1}$ plate can operate independently of other of the $V_{0/1}$ plates. When the latter case is true, pseudo-random distribution patterns for the $V_{0/1}$ and GND plates may be used so as to provide for some charge/purge activity irrespective of the alignment amongst the first through third layers and irrespective of the relative movement patterns amongst the first through third layers. For the particular alignment state, 275c which is shown in FIG. 2C, the charge carrying surface of $V_{0/1}$ plate 261c" lies adjacent to and faces the negatively polarized side of dielectric square region 263c", thereby encouraging positive charge to flow from the $V_0$ node to the $V_{0/1}$ plate 261c". The positive side of the same dielectric square region 263c" faces a negatively charged surface of a moving plate in the third layer, thereby further encouraging positive charge to flow from the $V_0$ node to the $V_{0/1}$ plate 261c". Although the latter, negatively charged moving plate of the third layer is not shown in the perspective view of FIG. 2C (this being done so that other parts of the diagram can be readily seen), it may be appreciated that the latter, negatively charged moving plate corresponds to negatively charged, square plate region 262c, which is shown in FIG. 2C.

In alignment state 275c, priming-phase electric fields are encouraged to form. Such priming-phase electric fields include a just-described, first set of fields that encourage positive charge to flow from the $V_0$ node to $V_{0/1}$ plates such as 261c". The priming-phase electric fields further include second fields that encourage negative charge (e.g., electrons) to flow into GND plates such as 261c, 261c''' from the GND circuit node. Referring to the square-shaped and positively-charged moving plate region 262c''' of the third layer, it may be seen that this plate region 262c''' faces the negatively polarized side of dielectric square region 263c'''. The positively polarized, opposite side of dielectric square region 263c''' faces GND plate 261c''' so as to attract negative charge (e.g., electrons) to flow into GND plate 261c''' due to the direction of the electric fields established in alignment state 275c.

For the charge purging phase of the trapped-charge, attraction-repulsion type, variable capacitor means 260C shown in FIG. 2C, the second and third layers may be each shifted left by one step for example so that $V_{0/1}$ plate 261c'' faces the positively polarized side of dielectric square 263c', and GND plate 261c''' faces the negatively polarized side of dielectric square 263c'. The negatively charged moving plate 262c' of the third layer will further face against GND plate 261c''', thereby further encouraging negative charge to flow out of the GND plate 261c''' and back toward the GND circuit node. A positively-charged moving plate (262c—not shown, but understood to be directly above 262c') of the third layer will further face against the $V_{0/1}$ plate 261c", thereby further encouraging positive charge to flow out of the $V_{0/1}$ plate 261c" and towards the $V_1$ circuit node (e.g., 121 of FIG. 1A). Although counter-facing V0/1 and GND "plates" are shown in FIG. 2C, it is within the contemplation of the disclosure to use other shaped members for condensively storing charge-carrying particles of opposite polarities and for evaporating the condensed charge at appropriate times. By way of example, interdigitated nanofibers might be used where the V0/1 and GND "nanowires" s are electrically insulated from one another and displaceable relative to one another so as to vary the effective capacitance.

Figure 3A:
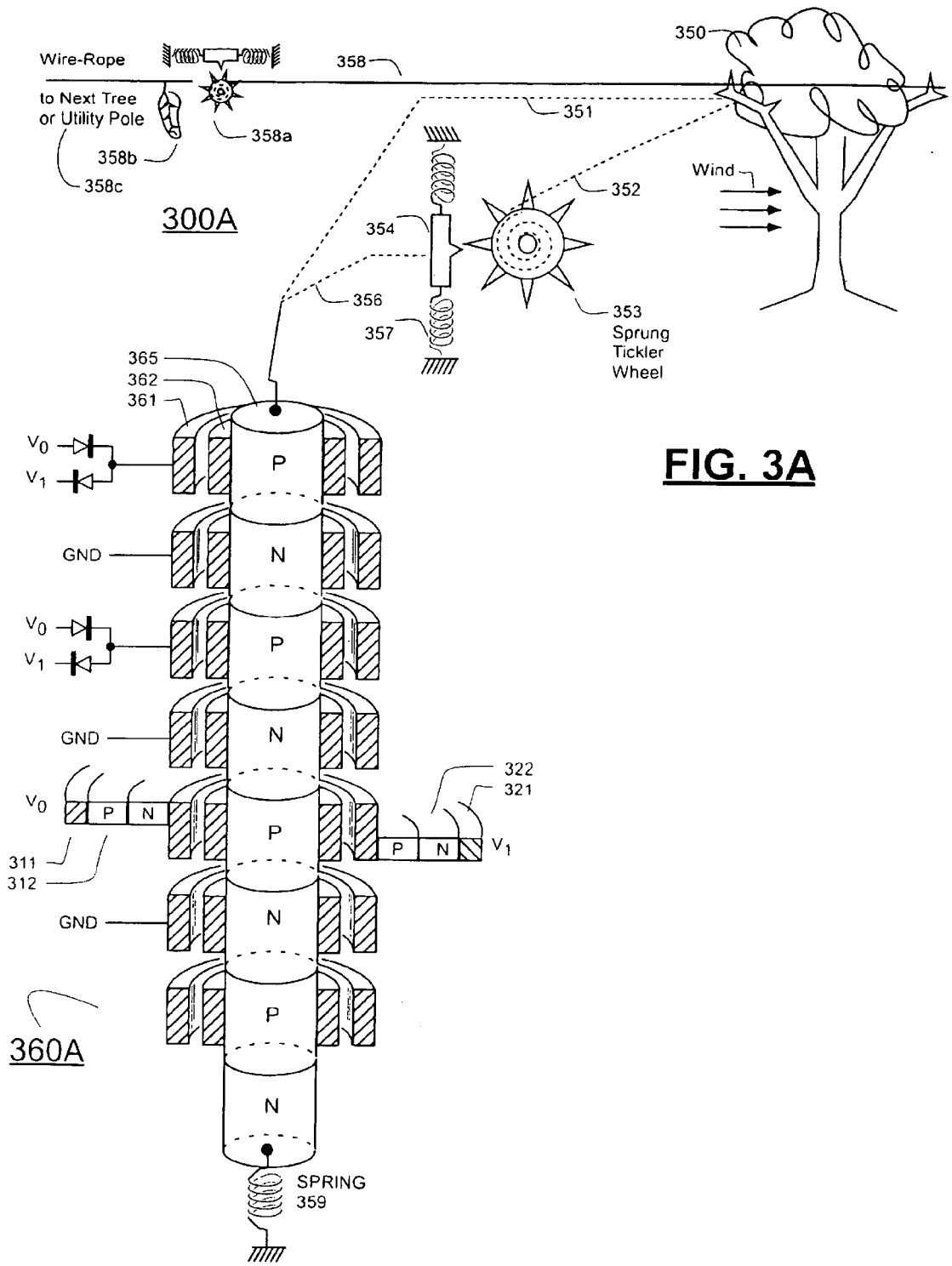
FIG. 3A is a combined schematic diagram and perspective sectional side view showing an implementation of another trapped-charge, attraction-repulsion type, variable capacitor means, and it possible coupling, in accordance with the present disclosure, to different kinds of renewable energy sources.

FIG. 3A, is a combined schematic diagram and perspective sectional side view showing an implementation 360A of another trapped-charge, attraction-repulsion type, variable capacitor means (A/R-type cap means), and of its possible coupling, in accordance with the present disclosure, to different kinds of renewable energy sources such as for example, a wind-swayed tree, bush (350) or other kind of flexible structure (e.g., a cloth wind sail—not shown). A reciprocateable core member 365, preferably having a cylindrical shape and/or made of a flexible material having semiconductor properties (e.g., a plastic semiconductor core) is provided with alternating P and N type semiconductor regions that define diodes for charging respective and separated, conductive annular members 362 to have trapped positive or negative charge. The conductive annular members 362 may be made of flexible, conductive plastic that is integral with a corresponding one of the alternating P and N type semiconductor regions and/or each such annular member 362 may be made of metal film adhered to and/or etch-formed on the core member 365.

The core member 365 is movable within, and fully or partially surrounded by an outer shell having respective and separated, conductive and annular or semi-annular members 361. Alternating ones of the outer shell's members 361 may be connected to the $V_0/V_1$ and GND nodes as shown. In one embodiment, current directing elements 312 and 322 (e.g., PN diodes) are integrally formed on respectively alternating ones of the outer shell's members 361 which connect to the $V_0/V_1$ nodes (311, 321) and these current directing elements 312 and 322 are electrically-isolated from one another (e.g., by an insulating oxide, not shown) while being respectively coupled to $V_0$ node 311 and $V_1$ node 321 as shown. A sheath (not shown) of high dielectric constant (e.g., having a permitivity greater than 10 where $\in_R$ of air is 1) may be interposed between the core conductive members 362 and the outer shell members 361 and may move with either one or neither. A lubricating wax or oil (not shown) of high dielectric constant (e.g., $\in_R > 10$) may be interposed between the core conductive members 362 and the outer shell members 361 for reducing friction between such core and outer members when the core 365 reciprocates relative to the shell 361.

In one embodiment, a direct mechanical coupling 351 (e.g., a rope or wire) is used for mechanically linking the reciprocateable core 365 to the energy supplying means 350

(e.g., a wind swayed tree branch, a canvas sail, an argon/helium-filled balloon, a kite, an airfoil, and/or another structure or combinations thereof that are oscillation-wise deformed by forces of nature). A spring 359 or other resilient means may bias the reciprocatible core 365 to remain substantially centered relative to the shell 361. When the wind blows or other forces of nature appear(e.g., ocean waves, earthquakes, etc.), the direct mechanical coupling 351 causes core 365 to reciprocate accordingly, thereby modulating the charge priming and purging characteristics of the A/R capacitance means defined by core 365 and one or more, thereto-coupled versions of shell 361.

In another embodiment, an indirect mechanical coupling 352 (e.g., a rope or wire) is used for mechanically linking the energy supplying means 350 (e.g., wind swayed tree) to a spirally or otherwise sprung tickler wheel 353. Outer prongs of the tickler wheel 353 tickle an oscillatible mass 354 into a resonant oscillation mode. The mass 354 is supported by a spring and/or other resilient means 357. The oscillatible mass 354 is mechanically coupled to core 365 by linkage 356 so that core 365 reciprocates when mass 354 oscillates. In this way, a singular and forceful movement by coupling 352 can be translated into a time-expanded series of oscillations of core 365. The more general concept is to devise ways of converting singular or slowly changing states of external energy sources into oscillating ones of relatively high frequency (e.g., 10's, hundreds, or more oscillations per second) so that the oscillating energy form is converted into electrical energy by the illustrated trapped-charge, attraction-repulsion type (A/R type) of variable capacitor means 360 and/or by another variable capacitor whose capacitance changes with physical movement. (Variable capacitors whose capacitance changes in response to factors other than physical movement, such as changing temperature, changing pressure (e.g., barometric), changing humidity, etc. are also contemplated for similar use.) Alternatively, a ratchet-coupled flywheel may be used. The ratchet mechanism (not shown) couples appropriately directed tugs of the primary energy source (e.g., wind-swayed tree 350) into mechanical energy pulses that keep the flywheel spinning in a desired same direction. The movable plates of a variable capacitor means may be attached to and/or driven by the spinning flywheel.

The direct or indirect mechanical couplings (351 or 352–356) which are used to drive variable capacitor means 360 may be hidden within individual trees (or other natural and/or man-made structures, e.g., artificial plants/trees—note that an artificial tree looks more natural than a conventional 3-blade horizontal axis wind turbine) and may be coupled between branches and/or to the ground or tree trunk so that when the wind blows, the boughs bend, and variable capacitor means 360 produces electrical energy. It is also within the contemplation of the present disclosure to extend couplings such as 358 between trees (350) and/or utility poles (358c) where coupling 358 includes electrical conductors for carrying priming energy to CIPR generating mechanisms such as represented by 358a and for carrying the increased energy away from the CIPR generating mechanisms (e.g., 358a, only one shown although it is understood that many can be strung along cable 358 and on trees 350), where the carried away electrical energy is then transferred to storage batteries and/or other energy storing and/or transmitting devices for further use as working energy.

Figure 3B:
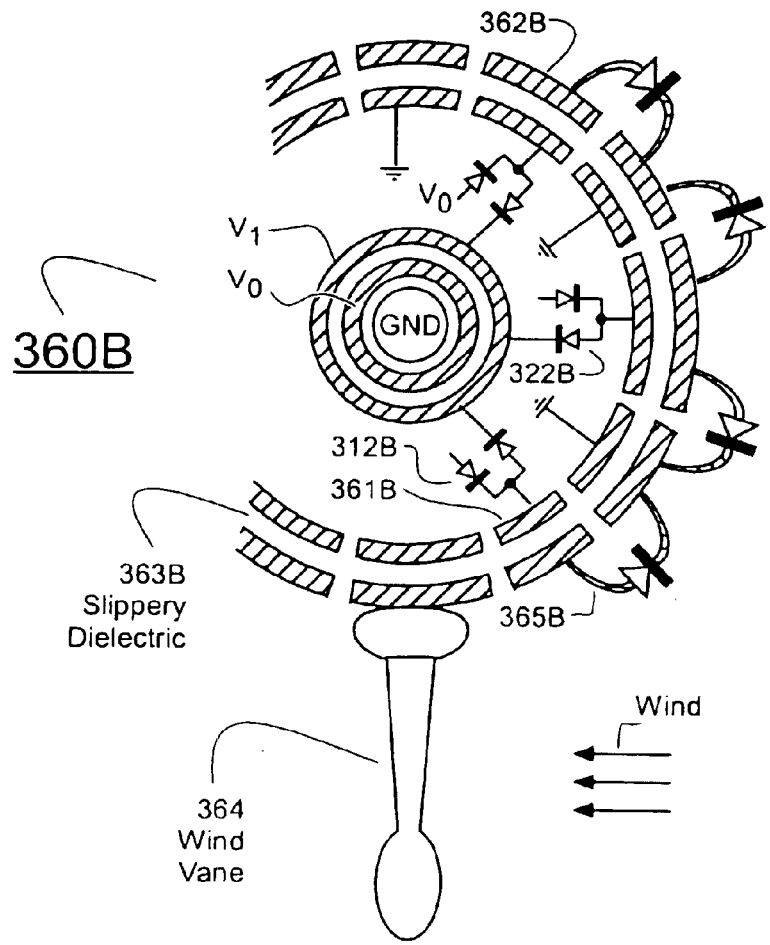
FIG. 3B is a cross sectional view of another trapped-charge, attraction-repulsion type, variable capacitor means wherein the prime and purge voltage conductors are on the interior and trapped-charge plates are provided rotationally and/or longitudinally reciprocatably more to the exterior.

The CIPR generating mechanisms 358a may also be mounted on the trees (350) and/or utility poles (358c) and energized by pulls on cable 358 and for by other energy sources. In hard-to access forests (e.g., on mountain tops), the cable 358 and its associated CIPR generating mechanisms (e.g., 358a) may be dropped from helicopter, balloon or other such means and optionally snared onto tree tops on calm days and thereafter used to collect wind energy on stormy days. Since such hard-to access installations may eventually be lost due to storms, fires, etc., they should be constructed of inexpensive and generally biodegradable materials. The variable capacitor means, for example may be constructed of vegetable oil impregnated cellulose sheets (embedded in biodegradable plastic mesh) with a patterned thin aluminum or other metal foil attached, so as to define substantially biodegradable, slidable sheets. Decorative artificial leaves 358b may be provided along the cables 358 to make their introduction into forests more aesthetically acceptable. The artificial leaves 358b may be arranged to themselves act as mini-sails that collect wind energy. The artificial leaves 358b may be inserted in a sphere-in-socket manner into a stator portion of a variable capacitor means where the spheroidal end of each leaf 358b acts as an AIR type rotor (comparable to reciprocateable core 365). A resilient foam or like means may be used to bias each leaf into its steady state, orthogonal or other position. Alternatively or additionally, the decorative artificial leaves 358b may define flexible fan blades for a rotor-on-the-outside A/R-type variable capacitor means 360B such as shown in FIG. 3B. Under a yet other additional or alternate approach, the decorative artificial leaves 358b may define thermally modulated variable capacitors that each correspond circuit-wise to element 267 of FIG. 2B. The $V_0/V_1$ diodes may integrally define blowable safety fuses, or such safety fuses may be separately provided so that, if a short circuit develops within a hard-to-access portion of an energy-producing grid, the shorted portion will be disconnected by the blowing of its fuses, and the rest of the grid can continue to produce and/or transmit electrical energy.

FIG. 3B is a cross sectional view of an energy transmitting and generating cable (or another such energy transmitting and generating device) that may be structured to have rotor-on-the-outside or hinged types of variable capacitors distributed longitudinally along the cable/device. A centrally located wire/conductor of the cable may carry the GND voltage, while a dielectrically insulated, next coaxial conductor (e.g., aluminum or another metal) carries the $V_0$ voltage, and while a dielectrically insulated, next coaxial conductor of yet wider diameter carries the $V_1$ voltage. One or more additional conductors (not shown) may carry sensor and/or control signals. One or more conduits (not shown) for carrying fluids, such as balloon inflating/deflating gases, may be additionally integrated into the cable. The cylindrical capacitors formed by the GND, $V_0$ and $V_1$ coaxial conductors and their separating dielectric insulators is can act as buffers for supplying priming charge to, and receiving purged charge from the A/R-type variable capacitor means formed by inner, stator plate elements such as 361B and the on-the-outside rotatable plate elements such as represented by 362B. Items 312B and 322B of course represent the priming and purging diodes (or other switching means for directing condensing and/or evaporating charge) that respectively couple the $V_0$ priming level to the variable capacitor means and purge the $V_1$ leveled charge out of the variable capacitor means. Item 365B is representative of the charge-trapping diodes (or other charge trapping means) distributively provided about the outer rotor.

A slippery wax, oil, silicone and/or other low friction dielectric material 363B (with preferably a high dielectric constant such as greater than about 2, or greater than about 10) may be provided between stator layer 361B and rotor layer 362B. Wind energy, liquid (e.g., water) current energy and/or other forms of mechanical force may be used to move the on-the-outside rotatable plate elements (362B) relative to the inner, stator plate elements (361B) and thereby produce purged electrical energy which flows through diodes such as 322B into the internal $V_1$ voltage conductor. By way of example, a singular one vane 364 (e.g., shown hanging downwardly due to gravity when no wind or other current is present), or a plurality of wind vanes may be provided around and/or along the generating cable. The vane may have a spoon-shaped cross-section such as shown or another cross sectional shape for encouraging unidirectional or bidirectional movement of the rotor (with or without encouragement of turbulent wind or other currents about the vane) when the wind blows and/or other forces move the vane(s). Structure 360B could be aligned vertically relative to the ground such as may be the case for a vertical-axis wind turbine or for serving as the mast of a sprung wind sail or the like. Structure 360B (without the optional wind vane(s) 364) could be integrally included as part of the sprung tickler wheel assemblies shown for example at 353 in FIG. 3A and at 353C in FIG. 3C.

Although one embodiment provides the on-the-outside plate elements (362B) rotatable about the core, it is also within the contemplation of the present disclosure to supplementally or alternatively provide the on-the-outside plate elements (362B) as being squares or other regular shapes (hexagons, circles, etc.) which can reciprocate longitudinally relative to alike counter-plate elements (361B) provided as alternating GND and V0/V1ones along the longitudinal axis of the V0/V1 carrying core. Such a supplemental or alternate structure would be able to convert axial movement of the on-the-outside plate elements (362B) into electrical energy. Also, additional wires may be embedded insulatively within the GND-carrying conductor or elsewhere for carrying digital and/or analog control and/or sense signals that control and/or sense the states of the energy-producing grid. In certain situations it may be disadvantageous to have the moving plates (362) all in the mode of being electrostatically attracted to the stationary plates (361) at one time, and all being electrostatically repulsed from the stationary plates (361) at a second time. Skips may be included in the periodicity of at least one of the moving or stationary plates (362, 361) so that when about 50% of the plates are in the electrostatically attracting mode a roughly balancing counterpart portion of the plates are in the electrostatically repelling mode so as the roughly neutralize the net attracting/repulsing force between the moving and stationary plates (362, 361).

Figure 3C:
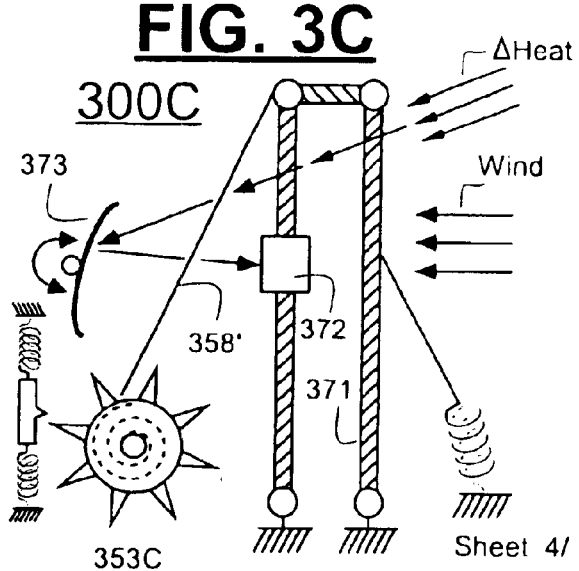
FIG. 3C is a side view of yet another CIPR system which may be used to energize one or more variable capacitor means.

FIG. 3C is a side view of yet another system 300C which may include and may be used to energize one or more of the variable capacitor means described herein. Structure 371 may be part of a wall, or of a high rise office building, or of any other man-made structure which sways or otherwise deforms in response to environmental forces such as wind, heat, earthquakes, etc. Connecting means 358' mechanically couples a tickler means such as shown at 353C (or to a flywheel means) to the swayable/deformable structure 371 so that deformation of the structure due to wind and/or other forces activates the tickler or other mechanical energy capturing means 353C and causes the associated variable capacitor means (not shown) to switch capacitance states and thereby generate electrical energy. A member 372 with a relatively high coefficient of thermal expansion (hi-COTE) may be included in the structure for converting changes in temperature into mechanical perturbation of the associated variable capacitor means (not shown).

One or more tiltable mirrors such as shown at 373 may be provided for intermittently directing solar energy at the hi-COTE member 372 and thereby inducing cyclical expansion and contraction of that member 372. The tiltable mirror(s) 373 may be made movable in response to a variety of actuating forces including, for example those provided by ambient wind and/or other solar-driven mechanisms (e.g., a so-called, drinking bird reciprocating mechanism or a so-called, solar Ferris wheel mechanism). When the tiltable mirror(s) 373 are not pointing to one hi-COTE member (e.g., 372) they can be made to instead point at another such hi-COTE member (not shown) so that solar radiation is consistently being used to expand one such hi-COTE member while another is cooling and contracting. (Such mirror-modulated solar energy may also be directed to variable capacitor means with temperature-sensitive dielectric(s) as shall be described below).

FIG. 3D is a side view of yet another system 300D which may include and/or may be used to energize one or more of the variable capacitor means described herein. A buoy 381 is floated in a body of water 380 (e.g., ocean, lake, river, etc.) which tends to develop waves and/or experience currents. At least one anchor or other buoy-stabilizing mass (M) 383 may be suspended below and coupled by way of opening 382 to a tickler and/or flywheel means 353b contained within an upper, substantially encased section (e.g., spheroid bubble section) 384 of the buoy 381. (Alternatively, mass 383 (or plural versions thereof) may be shaped like an airfoil to encourage its movement in response to underwater currents, in which case the buoy 381 may be secured against drifting away by other means, e.g., an overhead wire, rope or cable system 358D/360DB.)

An oscillatible mass 354D may be provided within encased section 384 and coupled both to the tickler/flywheel means 353D and to an associated variable capacitor means (not shown) so that when the relatively slow, oscillations of the buoy 381 in the wave-pitched and/or current-driven water 380 energize the tickler/flywheel means 353D, the latter means 353D causes the oscillatible mass 354D to move/vibrate at a higher rate/frequency and thereby generate electrical energy from the associated variable capacitor means (not shown) in response to the respective higher rate/frequency of the tickled movements or vibrations. The generated electrical energy may be stored in on-board rechargeable batteries (not shown) and/or transmitted over a buoy-to-buoy (or to shore, or to ship) coupling cable 358D that couples a farm of buoys like 381 to one another and to the shore or to another energy-harvesting location. (Energy harvesting may also be carried out by RF energy coupling and/or other wireless coupling means.) In one class of embodiments, the buoy-to-buoy coupling cable 358D is structured in accordance with FIG. 3B and is therefore denoted as cable 360DB. One or a combination of wind, wave and other water/air-current motions may be intercepted by the farm of buoys 381, etc. or peripheral attachments thereof and converted to electrical energy in accordance with techniques disclosed herein.

The described techniques do not preclude the use of more conventional energy producing techniques in combination with the variable capacitor based techniques disclosed herein. Hence, photovoltaic cells may be included on and/or within buoy 381 for converting part of the intercepted solar radiation into electrical energy. (If a solar collector means is placed high enough on or above the buoy, the body of water may be used as a reflector for capturing via a backside energy coupling means, i.e. parabolic mirror, additional solar energy that is not directly captured by a skywardpointing, topside solar energy collecting means.) Moreover, opening 382 may constitute a so-called, oscillating water column (OWC) and a magnetic inductance means may be driven by such an OWC when the water line (and trapped air in the OWC) oscillates up and down within the OWC 382. Moreover, the water in the OWC 382 may define an oscillating, fluidic capacitor plate (if the water has high electrolyte content e.g., NaCl) and/or an oscillating, fluidic dielectric layer (e.g., with dielectric constant of about 80 if the water has relatively low electrolyte content). A variable capacitance structure which can make use of such an alternating region 382 that is alternatingly filled with water and air shall be discussed when the rooftop rain catcher of FIG. 4A is described below. It may be appreciated here however, that a CIPR system may be integrated with a conventional OWC system to capture and convert additional energy not captured by the OWC system.

FIG. 3D further shows that a buoyant (e.g., lighter-than-air) mechanism such as a gas-filled balloon 390 may be tethered to the water-level buoy 381 to intercept fluid currents (e.g., wind currents) and/or generate a modulating pulling action on extension line 358'D in response to intercepted solar radiation, and/or intercepted rain fall. A gas-containing and resiliently expandable inner part 392 of the illustrated balloon 390 has a radiation absorbing (e.g., black-colored) bottom part 392b and a radiation-passing upper part 392a. Mylar plastic or other appropriate materials may be used to form these balloon parts 392a–392b. In one embodiment, a rotatable outer part 391 of the balloon has counterposing parts 391a and 391b that are respectively radiation-passing and radiation-blocking. The rotatable outer part 391 is mounted to rotate bi-stably about the inner part 392 so that, in a first stable state its radiation-passing part 391a is substantially aligned over the radiation-passing part 392a of the balloon's inner component 392; and so that, in a second stable state its radiation-blocking part 391bis substantially aligned over the radiation-passing part 392a of the balloon's inner component. The bi-stably rotatable outer part 391 is coupled to a tethering pulley 395, and balloon line 358'D passes at least partially about the pulley 395 if not wound about that pulley.

A resilient means (not shown) weakly urges the bi-stably rotatable outer part 391 into a radiation-unshielded first state. In such an unshielded first state, part 391 a is over 392a and solar radiation passes into the balloon to heat the lower inner part 392b. The balloon's internal gas (e.g., helium, argon, and/or others) heats and expands. The balloon therefore climbs higher in altitude. As it does, pulley 395 is rotated, and as a result, after a sufficient amount of rotating of pulley 395, the balloon's outer part 391 bi-stably flips into the radiation-shielding, second state wherein outer part 391b covers inner part 392a. (The radiation-shielding part 391b may have brushes on its inner surface for cleaning the transparent top part 392a of the balloon.) Now because solar radiation is reduced or blocked from heating the balloon's interior, the internal gas cools and contracts and the balloon descends in altitude. As it does, pulley 395 is rotated back, and as a result, after a sufficient amount of back rotating of pulley 395, the balloon's outer part 391 bi-stably flips back into the radiation-admitting, first state. The heating and cooling, ascending and descending phases repeat in accordance with the available amount of solar radiation. A variable capacitor means (not shown) may be provided within buoy 381 and coupled directly or indirectly (e.g., via an oscillating mass tickler mechanism) to the pulled-on balloon line 358'b to responsively generate electrical energy.

If desired, a more complicated (less desirable) arrangement may be used wherein a variable capacitor means (not shown) is alternatively or additionally included within the balloon 390 and balloon line 358'D incorporates part or all of the cable structure of FIG. 3B so as to intercept more of the solar radiation and wind energies that are available in the vicinity of the buoy 381. In one embodiment, a plurality (not shown) of balloons such as 390 are provided on each of plural, hub-and-spoke structures distributed along a balloon line such as 358'D and are designed to oscillate within different, respective altitude ranges. The structure may then define a relatively tall, energy-intercepting column that takes opportunistic advantage of solar radiations and/or wind bursts and/or rain bursts and/or water currents and/or water waves that become available within the different altitude ranges (which could include submarine as well as above water levels) of the volume occupied by the energy-intercepting column. Collected energy may be harvested from the column of balloons (or other buoyant devices) by RF and/or other wireless energy coupling means.

Instead of having a bistably rotating outer sheath 391a/b, it is possible to use a balloon-internal shutter means 393a/b. In a balloon-is-expanded mode, alternating transmissive and non-transmissive (e.g., reflective) rigid segments on elastically collapsible sheets are stretched out to be substantially orthogonal to the incident radiation so as to block absorption of incident solar radiation as is shown on the left side of the illustrated balloon 390. In a balloon-is-contracted mode, the alternating transmissive and non-transmissive rigid segments are roughly parallel to (not substantially orthogonal to) the incident radiation, as is shown on the right side of the illustrated balloon 390, so as to allow at least a portion of the incident radiation to enter the balloon and heat bottom portion 392b. Bistable hinges may be used to intercouple the alternating transmissive and non-transmissive rigid segments. Although the illustrated embodiment is seen to have just two layers of such alternating rigid segments with 50/50% intermix of transmissive and non-transmissive types, it is also within the contemplation of the disclosure to have a respective 75/25% dispersal of transmissive and non-transmissive types in each of four successive layers so that the 25% non-transmissive segments orient on the radiation-parallel sides of rectangular, hinged structures (repeated Z_I shaped structures) in the balloon-is-contracted mode. The balloon 390 may have an airfoil design and/or turbine design for converting wind currents into vertical and/or rotational movement(s). Appropriate, variable capacitor means may be included in the balloon and/or along its guide cable, 358'D for converting the vertical and/or rotational movement(s) of the balloon 390 into electrical energy.

FIG. 4A shows a building 400 that may be structured in accordance with the present disclosure to incorporate energy-producing variable capacitor means at its foundation and/or between its floors and/or on its roof and/or along its walls and/or elsewhere as may be cost efficient and convenient. Sliding A/R variable capacitor means such as schematically illustrated at 410 may be provided between inter-slidable floors and/or the foundation for converting oscillations between the floors and/or the foundation (especially slight oscillations not felt by the building's inhabitants if any) into electrical energy in accordance with the charge-investing, profit recapturing techniques (e.g., system 100 of FIG. 1A) disclosed hereby. Various elastomeric materials may be used between the sliding layers to encourage the appropriate vibrational modes so that building occupants will not be disturbed and yet wind, earthquake, road vibration, and/or other mechanical energies to which the building 400 is subjected are at least partially converted into useful electrical energy. The inter-plate pitch of the variable capacitor means can be very small, say on the order of a millimeter or less so that even subtle movements over a distance of centimeter or less are converted into useful electrical energy. Pneumatic means such as may move a fluid having parts with differing dielectric constants between charge condensing plates may be additionally or alternatively for converting building motions at least partly into electrical energy.

Sliding A/R variable capacitor means such as schematically illustrated at 423 may be alternatively or additionally provided between inter-slidable root tiles such as 420 and 421 or as aluminum or other metal/plastic siding along the walls of the building. A first 420 of alternating ones of the roof tiles (or exterior wall sidings) may have spring (resilient) sections 420a coupling them to the building proper so that when the wind blows, the corresponding roof-tiles (and/or wall sidings) 420 reciprocate relative to their unsprung, counterpart tiles/sidings 421. Temperature-morphable sections 421b with relatively high coefficients of thermal expansion (Hi-COTE) may be included in the unsprung, counterpart tiles/sidings 421 so that the latter reciprocate relative to their counterpart tiles/sidings 420 when the ambient temperature changes (e.g., due to the Earth rotating relative to the sun and/or due to a cloud patch moving by). The temperature insensitive tiles/sidings 420 should have Low-COTE sections 420b coupling them to the building proper.

Top sections of the roof tiles that are exposed to rain fall may include rain-capture structures such as shown at 431. The rain-capture structures 431 are essentially the same as variable capacitor means 260B of FIG. 2B with the slidable layer 262 removed. Falling rain drops form temporarily bridging, fluidic dielectric and/or conductive members between the $V_0/V_1$ and GND primary plates; thereby causing the capacitance to increase and decrease as the rain drops hit the roof and roll off. To prevent the water from adhering to the roof and more permanently forming fluidic dielectric and/or conductive bridging members, hydrophobic ribs (e.g., Teflon dams) 432 should be embedded between the $V_0/V_1$ and GND primary plates. The same kind of structure can be included in the OWC (oscillating water column) structure of the above described buoy. A hydrophobic Teflon or other hydrophobic electrically-insulative coating may fully cover the outer plates of rain-catcher 431 to protect its charge-trapping metal or other members from corrosion.

In the basement, garage or other such low occupancy section of the building there is usually a furnace 450 for heating water and/or providing heated air for purposes of temperature control in the building. Element 460 represents the provision to the furnace (or other waste-heat generating unit) of an intentional temperature modulating means in combination with thermally-modulated variable capacitor means for extracting electrical energy from the waste heat of the building furnace and/or other waste-heat generating units (e.g., air conditioning radiators, steam plant radiators, etc.).

FIG. 4B shows a possible version 460' of part of such a waste-heat extracting mechanism in more detail. A hot-fluid (e.g., hot gas) carrying first manifold 461 carries hot fluid from the waste-heat generating unit (e.g., furnace 450) in such a manner that even if the waste-heat extracting mechanism 460' stops changing its states, the hot gas (or other fluid) exhaust will be safely conducted away as it normally would without the presence of the interposed waste-heat extracting mechanism 461. In other words, mechanism 460' is designed for fail-safe operation. A cold fluid (e.g., cold gas) injecting second manifold 463 is understood to run parallel to the first manifold 461 and to carry a flow of cold air (or other fluid) into the openings denoted as "C" in stationary member 462. The cold-fluid injecting manifold 463 is shown partly turned away from its normal position so that its counterpart, hot-fluid manifold 461 can be better seen. The openings denoted as "H" in stationary member 462 are understood to be apertures through which the hot fluid of the first manifold 461 passes.

A rotating, gating member 464 is provided and in FIG. 4B it is shown exploded away from its counterpart, stationary valve member 462 so that the interaction of the illustrated, two gating apertures 464a and 464b can be better seen relative to the H and C, four apertures of stationary member 462 and relative to the fluid collecting pipes, 465a and 465b of the manifold 465 that collects the temperature-modulated output fluid which alternatingly comes from the first and second manifolds, 461 and 463, and which respectively passes through gating apertures 464a and 464b as member 462 rotates or otherwise changes state. In one gating state, the cold flow is directed to move into manifold 465 from gating apertures 464a. In the illustrated, second gating state, the hot flow moves into manifold 465 from gating apertures 464b. A temperature-modulated, variable capacitor means 470 is thermally coupled to (or forms part of) the output-flow collecting manifold 465. As the temperature of the passing-by fluid modulates between comparatively hot and cold values (the specific temperatures may be different according to application), the temperature-modulated, variable capacitor means 470 modulates between its charge condensing and charge purging states. A CIPR system is operatively integrated with the temperature-modulated, variable capacitor means 470 for investing low energy charge and recouping high energy charge in accordance with the principles of the present disclosure.

FIG. 4C shows a cross-sectional view of a possible version 470' of the temperature-modulated, variable capacitor means. A high-COTE (coefficient of thermal expansion) material forms a major part of layer 473 and the layer has at least one or two electrically conductive outer surfaces if not being composed entirely of a high-COTE conductive material (e.g., aluminum). This Hi-COTE layer 473 is sandwiched between two resilient dielectric layers 472 and 474. One or both of the resilient dielectric layers 472 and 474 may be such that they have relatively high dielectric constant when compressed and relatively low dielectric constant when decompressed. (For example, particles of material with relatively high $\in_R$ may be dispersed within resilient material with substantially lower $\in_R$).

Two relatively low-COTE layers, 475 and 471, each having at least one or two electrically conductive outer surfaces if not composed entirely of low-COTE conductive material (e.g., steel) are provided about and therefore sandwich the resilient dielectric layers 472 and 474. A ferroelectric dielectric 476 with relatively high dielectric constant and a relatively low Tc (e.g., a $T_c$ of less than about 1000° C. or less than about 300° C.) is provided adjacent to low-COTE layer 475. Another relatively low-COTE layer, 477 is provided adjacent to ferroelectric dielectric 476.

The illustrated structure 470' may be repeated many times over (with layer 477 merging into 471 of a next repeat) planarly or concentrically or otherwise. A spirally wound construct may work best in terms of manufacturability. The spiral construction should be initially wound at a temperature substantially below its expected operating range. As temperature rises to the expected ambient range, Hi-COTE layer 473 expands to tighten the structure and to reduce the thickness of one or more of resilient layers 472 and 474.

During normal operation, when temperature rises to near the top of the expected operating range, Hi-COTE layer 473 expands to a range-maximal thickness thereby effecting a range-maximal capacitance between layer 473 and one or both of the Low-COTE conductive layers 471 and 475. When temperature drops during normal operation to near the bottom of the expected operating range, Hi-COTE layer 473 constricts to a corresponding, range-minimal thickness thereby effecting a range-minimal capacitance between layer 473 and one or both of the Low-COTE conductive layers 471 and 475. That defines one, temperature-modulated variable capacitor means.

Layer 476 may be constituted by a ferroelectric material or a liquid crystal material or another material whose ∈R changes dramatically within the expected ambient operating range of the structure 470'. Typically, $\in_R$ drops dramatically as the temperature of layer 476 increases above a critical curie point, $T_C$ or a like point. Thus, as the capacitance associated with Hi-COTE layer 473 increases due to rising temperature, the capacitance associated with $T_C$ layer 476 decreases; and as the capacitance associated with Hi-COTE layer 473 decreases due to dropping temperature, the capacitance associated with $T_C$ layer 476 increases. One possible material for layer 476 is doped or undoped Rochelle salt where the latter has a $T_C$ around room temperature (about 24° C). Doping my be used to adjust the $T_C$ of a given ferroelectric or other such temperature-dependent dielectric material as appropriate. Ferroelectric or other such temperature-dependent dielectric materials tend to have very large $\in_R$'s below their respective $T_C$ levels and substantially lower dielectric constants above. Of course a spirally wound version of structure 470' may have multiple copies of cross section 470' with each copy having a different $T_C$ so that capacitances are making their substantial value changes at a variety of points along the expected operating range of the structure. As temperature cycles from cold to hot and then back to cold, appropriate ones of the temperature-modulated variable capacitor means may be primed with invested and trapped, charge and thereafter modulated to increase the energy level of the trapped charge, and then the further-energized charge may be purged for performing useful work and/or storage.

Referring to FIG. 1B as well as to FIG. 1A, it has been alluded to above that a charge depletion problem may be associated with the operation of the first voltage source 110. The discharge and/or recharge mechanisms of source 110 may not be 100% perfect. As such, even though charge-donating source 110 contributes an investment charge amount $Q_0$ to variable capacitor means 115 in the priming phase, and theoretically, the same amount of charge $Q_0$ should be returned to source 110 in the purging phase, the investment-contributing source 110 may not be able to reabsorb 100% of the returned investment at the time it is returned or it may not be able to again, reinvest the full amount of $Q_0$ the next time an investment opportunity presents itself (e.g., when the capacitance of means 115 increases again). Over time, source 110 may become depleted of its charge unless it is somehow replenished.

A multitude of solutions are available after the problem is recognized. If the charge-investing, profit recapturing, first system 100 shown in FIG. 1A is used for example, and the first and second voltage sources 110, 120 include physically swappable, rechargeable batteries; then these batteries may be simply swapped from time to time. The charge contributor becomes the profit beneficiary and vice versa. A mechanical or electrically-activated switching mechanism (not shown) may be installed into system 100 to more conveniently carry out the role-swapping operation. Another option is to have the profit beneficiary 120 send part of its profit charge back to contributor 110 from time to time. This may be done through the bidirectional, DC to DC converter 105. Although not shown, an additional connection may be made from unit 105 to node 111 so that replenishment current can flow directly into rechargeable source 110. Alternatively, replenishment power may be sent from AC power lines 102 into the series combination of batteries 110 and 120 from time to time. Additionally or alternatively, if the first voltage source 110 includes a fuel cell, the latter may be refueled or replaced with a fresh one from time to time. Additionally or alternatively, if the first voltage source 110 includes a photovoltaic power array, the latter may be used to supply replenishment power from time to time as solar radiation or the like becomes available.

FIG. 1B shows a charge-investing, profit recapturing, second system 100B that solves the charge depletion problem. The circuitry shown to the right of the first and second voltage sources 110', 120' is essentially the same as that shown to the right of counterpart voltage sources 110, 120 of FIG. 1A. Diode 11 2a carries priming current to the first variable capacitor ($C_{va}$) means 115a while diode 122a carries purged current from the first variable capacitor means 115a to the series storage combination of voltage sources 110' and 120'. Fluctuating energy source 150' couples to $C_{va}$ for modulating the capacitance of that variable capacitor means 115a in accordance with one or more of the methods described herein or in accordance with other appropriate methods.

The circuitry (e.g., 115b) shown to the left of the illustrated first and second voltage sources 110', 120' reverses the roles of sources 110', 120'. The second voltage source 120' acts as the charge contributor and diode series 112b carries priming current ($I_{prime.b}$) from source 120' to the second variable capacitor means 115a ($C_{vb}$) during the high-capacitance phase (charge condensing phase) of $C_{vb}$. The first voltage source 110' acts as the profit recouper and diode 122b carries purged current ($I_{purge.b}$) from the second variable capacitor means 115b to the series storage combination of voltage sources 110' and 120'. Fluctuating energy source 150' couples to $C_{vb}$ for modulating the capacitance of that variable capacitor means 115b in accordance with one or more of the methods described herein or in accordance with other appropriate methods. The capacitance modulating phases of $C_{va}$ and $C_{vb}$ can be made independent of one another and can be arranged to accommodate the optimal respiration patterns (discharge and recharge) of the first and second voltage sources 110', 120' as may be appropriate. If for example, it is better to have the first and second voltage sources 110', 120' acting 1800 out of phase with each others discharge and recharge modes, then $C_{va}$ and $C_{vb}$ can be intercoupled to fluctuating energy source 150' to provide a similar 1800 out of phase relationship with respect to their high and low capacitance modes. Say, for example, that $C_{va}$ (115a) is being discharged (its capacitance is decreasing) at the same time that $C_{vb}$ (115b) is being primed (its capacitance is increasing). It may seem that the first purge current ($I_{purge.a}$) from the first variable capacitor means 115a can slip past the series storage combination of voltage sources 110' and 120' and simply flow into $C_{vb}$ (115b). However diode 122b blocks that from happening, its disposition forcing the current to instead flow through diode series 11 2b and through second voltage source 120'.

Diode series 112b may be constituted by a series of photovoltaic cells (e.g., 112b.1, 112b.2, ... 112b.3) whose cumulative threshold drops is less than the full voltage ($V_1-V_0$) of the second voltage source 120'. In such a case another kind of charge generation and/or replenishment action may occur. When $C_{vb}$ (115b) is being primed (as its capacitance is increasing), the priming current ($I_{prime.b}$) will temporarily bias the photovoltaic cells 112b.1–b.3 into their forward conduction mode, thereby eliminating the charge depletion zones at their PN junctions, where such charge depletion zones (not shown) are typically needed for converting intercepted solar or other radiation (λ) into separated positive and negative charges. (Negative charge carriers—electrons—flow into the N side of the PN junction while positive charge carriers—holes—flow into the P side.) Once $C_{vb}$ is primed to the full voltage ($V_1-V_0$) of the second voltage source 120', the forward voltage drop across photovoltaic cells 112b.1–b.3 decreases to about zero and the internal charge depletion zone of each PV diode reappears. If solar or other radiation (λ) is intercepted at this time, the sum of the voltage across $C_{vb}$ (115b) and across PV cells 112b.1–b.3 should exceed $V_1-V_0$. Generated electrical energy can then flow into the second voltage source 120' for storage therein until the sum of voltage drops across $C_{vb}$ (115b) and PV cells 112b.1–b.3 decreases to approximately match $V_1-V_0$. The latter decrease typically comes about because of a decrease in voltage across $C_{vb}$. When fluctuating energy source 150' squeezes further charge out of $C_{vb}$, the latter action pushes PV cells 112b.1–b.3 into deeper reverse bias conditions. The PV cells 112b.1–b.3 can be thought of as secondary variable capacitor means in this case because charge is pushed out from them as their respective charge depletion zones enlarge. Of course, the PV cells 112b.1–b.3 should be structured to avoid reverse voltage break down in this phase.

Diode 132 is provided across $C_{vb}$ for two reasons. First, it prevents $C_{vb}$ from becoming polarized in counterproductive direction (counter to the polarity of the second voltage source 120') which could happen if source 120' becomes sufficiently discharged and photovoltaically-generated current from cells 112b.1–b.3 flows into $C_{vb}$. Second, if source 120' is essentially discharged (for whatever reason—e.g. an external load has drained it), diode 132 allows replenishment energy to flow from PV cells 112b.1–b.3 into the reduced-voltage source 120' so as to kick start it and enable opportunistic investment of that charge into the second variable capacitor means 115a ($C_{vb}$) when the fluctuating energy source 150' begins to fluctuate again (e.g., when the wind kicks up again at the end of a hot, gustless day in the desert).

Figure 5:
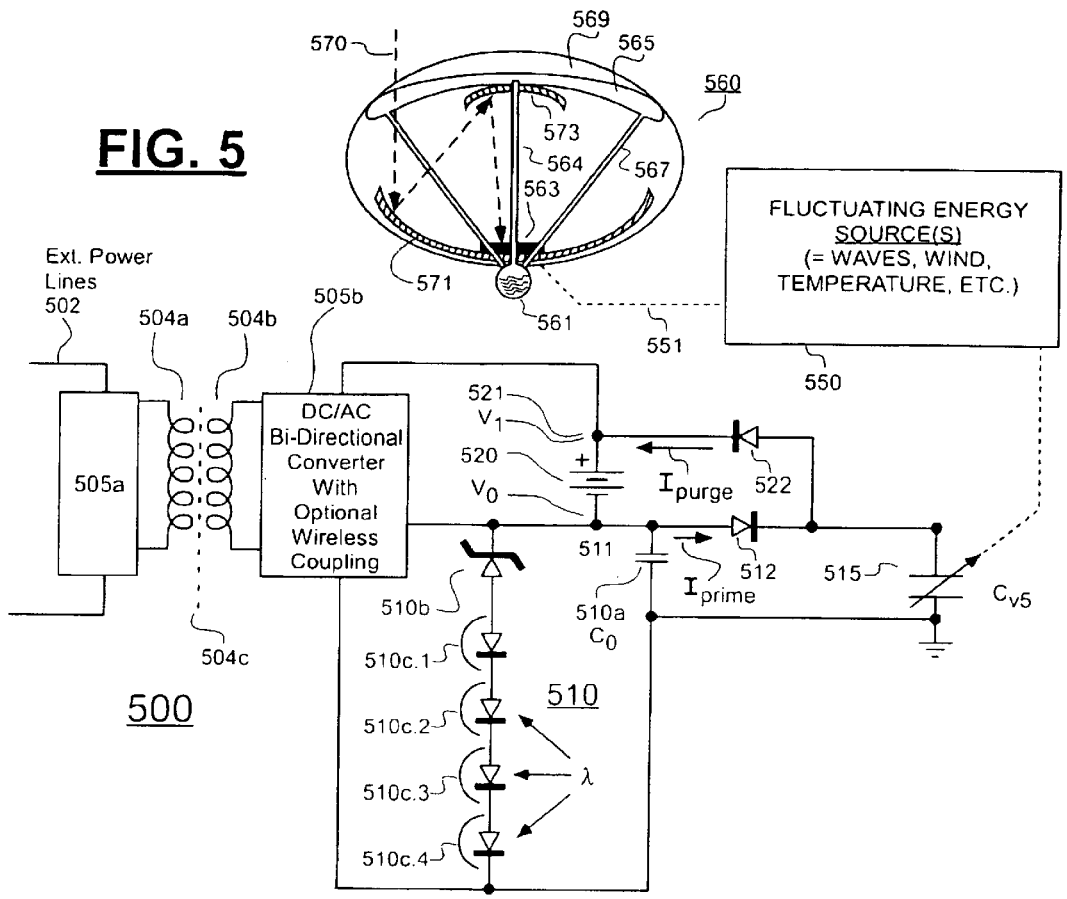
FIG. 5 is a schematic diagram of a third, charge-investing, profit recapturing system that may be used in accordance with the present disclosure with an optional, fluidic solar umbrella subsystem.

Referring to FIG. 5, another drawback of the charge-investing, profit recapturing, first system 100 introduced in FIG. 1A is that in some embodiments it calls for the provision of two separate batteries (or other appropriate charge donating and recoupment units) 110 and 120. The charge-investing, profit recapturing, third system 500 of FIG. 5 constitutes one way of reducing the number of separate batteries/charge donating-and-recoupment units. A first voltage source 510 is constituted by base capacitor 510a ($C_0$) which can be a conventional fixed capacitor or a supercapacitor that is coupled in parallel to a series circuit comprised of a plurality of photovoltaic cells 510c.1–510c.4 as well as an oppositely facing Zener diode 510b or another such voltage limiting means. When variable capacitor means 515 ($C_{VS}$) shifts into its charge-priming mode (into its high-capacitance, donation-receiving mode), it draws a first amount of charge ($Q_0$) from the base capacitor $C_0$ (510a). Voltage $V_0$ at node 511 should drop as a result and should thereby allow the photovoltaic cell array 510c.1–c.4 to supply additional charge ($Q_1$) to base capacitor $C_0$ if sunlight or other radiation (λ) is provided at the time. Although not shown, the first voltage source 510 may additionally or alternatively be constituted by an RF-to-DC demodulator which captures ambient radio-frequency or other electromagnetic radiation and converts the captured electromagnetic radiation into direct current (DC) charge for ultimate donation into the variable capacitor means 515.

When the variable capacitor means 515 shifts into its charge purging mode (into its low- or anti-capacitance mode), it discharges part or most of the first amount of charge ($Q_0$) through rechargeable battery 520 and also back into the first voltage source 510. If the Zener diode 510b remains reverse biased (without Zener breakdown), the purged charge $Q_0$ should be summed with the photovoltaically-added new charge $Q_1$ within the base capacitor $C_0$ to thereby provide a charge build up process. The charge accumulation process may repeat again and again until charge builds up in the base capacitor $C_0$ to peak value of about, $V_{0peak}=V_{PV}+V_{Rzener}$, where $V_{Rzener}$ is the reverse bias breakdown voltage of Zener diode 510b and $V_{PV}$ is the voltage generated by photovoltaic cell array 510c.1–c.4 when exposed to the maximum available sunlight and/or other radiation. When this self-limiting condition occurs, excess charge produced by the system may disadvantageously be wasted away as heat due forward conduction of current through the photovoltaic cells series 510c.1–510c.4. (In accordance with the disclosure, another CIPR subsystem may convert waste heat from electronic components into stored electrical energy.)

One possible solution is to include a peak value detector circuit (not shown) within the power-transfer interface subsystem 505b. If proximity to the $V_{0peak}$ value is detected, the power-transfer interface subsystem 505b may be automatically activated to withdraw some charge at least from the base capacitor $C_0$ if not also from the profit-storing means (e.g., rechargeable battery) 520. This should reduce $V_0$ below the level of $V_{0peak}$ and thereby allow the photovoltaic cell array 510c.1–c.4 to usefully pump more, photovoltaically-generated charge into the system.

The prime and purge aspects of FIG. 5 should be self explanatory due to the use of like reference numbers in the "500" century series corresponding to like numbered elements in the above-described drawings. Power interface unit 505b is shown coupled to node 511 as well as to node 521 and GND. This is to be understood as indicating that current may be drawn from either one or both of rechargeable battery 520 and base capacitor $C_0$ as appropriate to supply power to external power lines 502 when such a power transfer is deemed economically beneficial. This is to be additionally or alternatively understood as indicating that replenishment current may be supplied to either one or both of rechargeable battery 520 and base capacitor $C_0$ as appropriate from the external power lines 502 when such a power transfer is deemed economically beneficial.

The coupling between power-interface units 505a and 505b may include a wireless (e.g., radio frequency) energy coupling 504c between external power lines 502 and the remainder of third system 500 such that parts to the right of dividing line 504c may reciprocate or other wise move relative to parts to the left. The wireless energy coupling may be provided by electromagnetically coupled coils 505a, 505b or by other appropriate means depending on the energy coupling methodologies utilized (e.g., low frequency AC (less than 1 KHz), RF, electrostatic coupling, magnetic coupling, optical coupling, etc.). Such wireless energy coupling may be used if the parts to the right of dividing line 504c are disposed within a balloon or another moveable, energy collecting means.

In one embodiment, the fluctuating energy source 550 may include one or more so-called, fluidic solar umbrella subsystems such as the one shown at 560 being coupled (551) and/or overlapped the CIPR system 500 to provide electrical energy. A glass, metal or other appropriate, fluid holding bulb 561 may be provided below a base parabolic mirror 571 and may be thermally coupled to a radiation absorbing body 563 which provided at the top center of the base parabolic mirror 571. Available solar or other radiation 570 is collected by the base parabolic mirror 571 and focused towards an inverted, upper parabolic mirror 573 of substantially smaller diameter and disposed above the radiation absorbing body 563. The upper parabolic mirror 573 focuses its collected radiation onto the radiation absorbing body 563. (The photovoltaic cell array shown at 510c.1–c.4 and/or the series 112b.1–112b.3 of FIG. 1B may be included at the top portion of body 563.)

Within bulb 561, there is provided a working fluid which could be white-dye-colored alcohol and/or another radiation-blocking liquid. As the temperature of the absorbing body 563 rises, its heat is coupled to the liquid in bulb 561. The increased temperature causes the dye-colored alcohol and/or other working liquid in bulb 561 to undergo a volume-expansive phase change (e.g., to vaporize). The heated and volume-expanded fluid rises up along first tube 564 towards a transparent, umbrella-shaped, elastic pouch 565 that is disposed above the upper parabolic mirror 573. In one embodiment, a temperature activated, one-way valve (not shown) opens at the top of tube 564 to let the heated fluid into pouch 565 when a predefined first temperature (e.g., substantially above room temperature) is exceeded. As the elastic pouch 565 fills with the dye-colored or other working fluid (e.g., a white colored or other radiation reflecting fluid), it begins to block or it reduces the amount of incident radiation 570 striking the base parabolic mirror 571. Because the pouch 565 has a relatively large surface area and it is thermally coupled to the ambient surroundings (e.g., air), the fluid in the pouch 565 begins to cool, undergoes a volume-shrinking phase change (e.g., condensation) and quantities of the fluid begin to collect in the bottom parts of the umbrella-shaped pouch. The cooled fluid descends down one or more second tubes 567 towards the base-shaded bulb 561. As the cooled fluid does so, it may pass through the radiation absorbing body 563 for further reducing the temperature of the absorbing body 563, which body 563 is now being struck by a reduced amount of, or none of radiation 570 due to the working fluid still remaining in umbrella pouch 565. In one embodiment, temperature activated, one-way valve(s) (not shown) open at the top(s) of tube(s) 567 to let the cooled fluid out of pouch 565 and back to bulb 561. This happens when a predefined second temperature, below the first temperature, is reached. The elasticity of the pouch forces the cooled liquid back into bulb 561. An elastic reservoir (not shown) may be further coupled to bulb 561 for compensating for volume changes. In another embodiment, reflector 573 is moveable and is alternatingly caused to direct radiation at and away from radiation absorbing body 563 as the moveable version of reflector 573 moves.

The radiation absorbing body 563 may include a temperature-modulated variable capacitor means such as shown in FIG. 4C. The oscillating temperature of body 563 may be used to generate electrical energy in accordance with the principles of the present disclosure. In an alternate embodiment, region 563 is occupied by plural ones of thermally separated variable capacitors and the upper mirror 573 is encouraged to slowly shift its focal point amongst the plural, temperature-modulated capacitors, thereby providing a high frequency modulation of the capacitors. Also in one embodiment, the fluidic solar umbrella subsystem is contained within a helium and/or other gas filled balloon 569 having at least a transparent top. As the radiation absorbing body 563 heats and cools, the balloon's gas expands and shrinks; and the balloon may rise and fall in altitude as a consequence. This physical movement may be used for generating further electrical energy in accordance with the various techniques presented in this disclosure. he parts of system 500 to the right of dividing line 540c may be enclosed within the moveable balloon -or within another form of weather-protective shell 569—and the wireless energy coupling 540a–540b may be used for transferring energy between the interior and the exterior of shell 569. The heat-circulated fluid of the described structure may also serve as a fluidic dielectric having parts of different dielectric constants which are propelled between opposed charge collecting members (e.g., capacitor plates) to thereby provide yet another form of variable capacitor means.

Figure 6A:
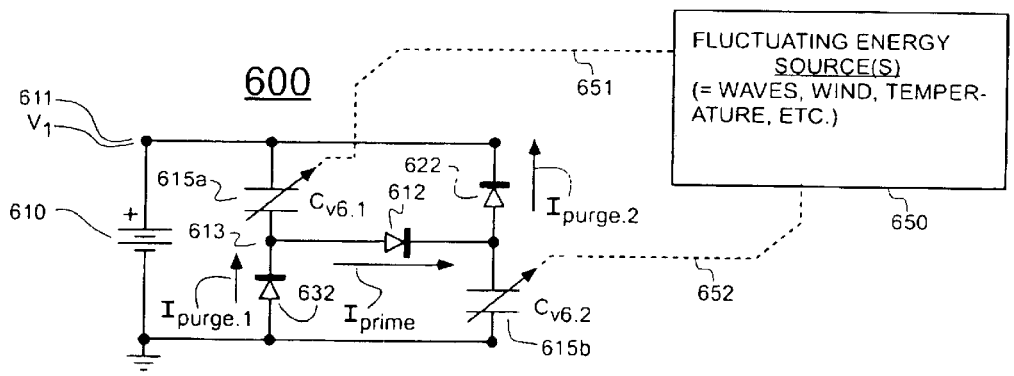
FIG. 6A is a schematic diagram of a fourth, charge-investing, profit recapturing system that includes a plurality of voltage splitting, variable capacitor means that are to be purged in unison or in succession so to enable a single charge donor-and-recouper option in accordance with the present disclosure.

FIG. 6A shows yet another way (600) of reducing the number of separate batteries/charge donating-and-recoupment units. The potential of first voltage source 610 is split across a plurality of variable capacitors such as shown at 615a ($C_{v6.1}$) and 615b ($C_{v6.2}$) during the priming phase, where priming current $I_{prime}$ flows through a series diode such as 612 which is placed in series between the plural variable capacitors 615a, 615b. During the charge purging phase the plural variable capacitors such as 615a, 615b are switched to their low- or anti-capacitance modes either in unison or successively. For example, capacitor $C_{v6.1}$ may be forced by energy coupling 651 to go into its low- or anti-capacitance mode first. The corresponding purge current $I_{purge.1}$ flows through diode 632 and into rechargeable voltage source unit (e.g., battery) 610. Series diode 612 blocks the first purge current $I_{purge.1}$ from simultaneously flowing into capacitor $C_{v6.2}$. Second capacitor $C_{v6.2}$ may be forced by energy coupling 652 to go into its low- or anti-capacitance mode in an overlapping or later time. The corresponding second purge current $I_{purge.2}$ flows through diode 622 and into the rechargeable voltage source unit (e.g., battery) 610. Series diode 612 blocks the second purge current $I_{purge.2}$ from simultaneously flowing into first capacitor $C_{v6.1}$.

A charge profit is obtained because during the priming phase, the donated amount of charge, $Q_0$ flows serially into the series of variable capacitor means, 615a–615b. However, during the simultaneous and/or successive purgings, the $Q_0$ in each of the plural capacitors, $C_{v6.1}$–$C_{v6.2}$ flows in parallel or repeated succession into the rechargeable voltage source unit (e.g., battery) 610. In the illustrated case where there are just two variable capacitor means, 615a–615b, source 610 donates charge amount $Q_0$ in the priming phase but recoups 2-times $Q_0$ in the purge phase, thereby reaping a charge profit of about (2 minus 1) times $Q_0$.

Figure 6B:
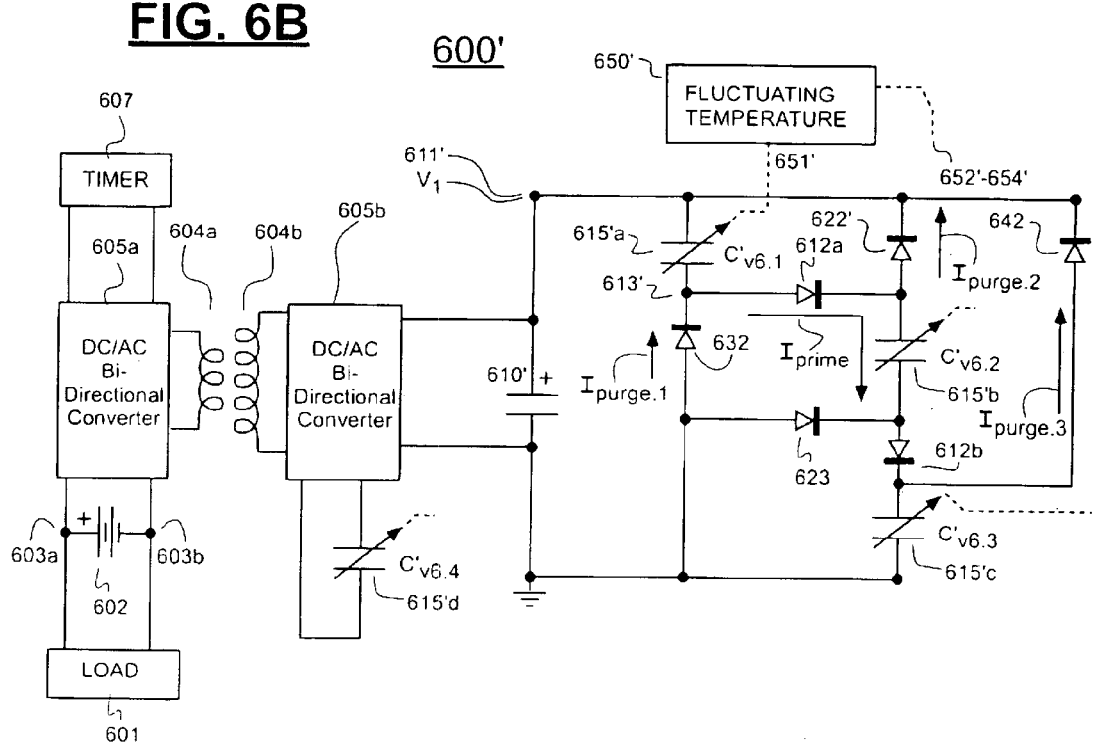
FIG. 6B is a schematic diagram of a fifth, charge-investing, profit recapturing system that includes a plurality of voltage splitting, variable capacitor means that are to be purged in unison or in succession.

FIG. 6B shows another embodiment 600' where there are three variable capacitors, $C'_{v6.1}$–$C'_{v6.3}$ organized to receive in series a same priming current $I_{prime}$. The charge profit in this other embodiment 600'should be about (3 minus 1) times $Q_0$. Here is why. During the priming phase, the donated amount of charge, $Q_0$ flows serially into the series of variable capacitor means, 615'a, 615'b, 615'c while also flowing through diodes 612a and 612b. If the illustrated three capacitor means, $C'_{v6.1}$, $C'_{v6.2}$, $C'_{v6.3}$, are of about equal capacitance at the time, the source voltage, $V_1$ should split as roughly equal thirds across capacitors 615'a–615'c. (The threshold drops of diodes 612a and 612b are assumed to be negligible in this example.) During the simultaneous or successive purgings, the $Q_0$ in each of the plural capacitors, $C'_{v6.1}$–$C'_{v6.3}$ flows in parallel or repeated succession into the rechargeable voltage source unit (e.g., supercapacitor) 610'. Assuming the voltage, $V_1$ at node 611' remains substantially unchanged, the charge profit should be equal to about (3 minus 1) times $Q_0$, where $Q_0 = C'_{vMAX}$ ($V_1/3$) and $C'_{vMAX}$ is the maximum attained capacitance of each of $C'_{v6.1}$–$C'_{v6.3}$.

It is within the contemplation of this disclosure to, of course, have a larger number of plural, variable capacitor means, $C'_{v6.1}$–$C'_{v6.N}$ coupled in series for thereby increasing the return on investment ratio (ROI). However, note that the invested amount of charge per such capacitor, $Q_0 = C'_{vMAX}$ ($V_1/N$) drops with increased values of N and the number of series diodes such as 612a–612b increases, thereby disadvantageously increasing the $I^2R$ power loss during the priming phase. One possible way of countering this problem is to raise the value of the N-divided voltage, $V_1$ at node 611' so that more charge will be stored across each of the series-connected, variable capacitor means, $C'_{v6.1}$–$C'_{v6.N}$. FIG. 6B shows a DC-to-AC-to-DC bidirectional converter 605a–605b being provided between a primary-side rechargeable battery 602 and the secondary-side rechargeable voltage source unit (e.g., supercapacitor) 610'. AC transformer 604a–604b can be a step-up type where the secondary-side voltage is substantially larger than the primary-side voltage. For example, if the voltage of the primary-side rechargeable battery 602 is in the range of about 3V–18V, the N-divided voltage, $V_1$ at node 611' may nonetheless be in the range of about 200V–600V (for N being 2, 3, or 4). This step-up arrangement (where the voltage step-up is of course in the priming direction, and there is a counterpart step-down when discharging energy from unit 610' to unit 602 and/or its load 601) can be particularly advantageous when the primary-side rechargeable battery 602 and/or its load 601 need to operate at relatively low voltage.

Figure 6C:
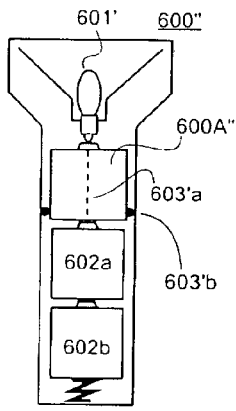
FIG. 6C is a cross sectional view of a rechargeable flashlight assembly incorporating a charge-investing, profit recapturing system in accordance with the present disclosure.

By way of example, load 601 can be part of an emergency flashlight or of another emergency services system (e.g., fire, smoke, and/or intrusion detection and alarming systems) that is to be used particularly when the normal AC power system becomes nonoperational. FIG. 6C is a cross sectional view of such an emergency flashlight 600" that is structured in accordance with the present disclosure. The manual or other type of ON/OFF switch is not shown in. order to avoid illustrative complexity. It is not uncommon for a user to flick the ON/OFF switch of an emergency flashlight to the ON position during a power blackout situation, only to discover that the internal batteries (602a, 602b) have self discharged after a prolonged period of non-use. In accordance with the present disclosure, however, the internal batteries 602a, 602b are rechargeable ones and the flashlight 600" includes is an additional subcircuit 600A", which in combination with rechargeable batteries 602a, 602b and lightbulb 601', defines an embodiment of circuit 600' of FIG. 6B. The variable capacitor means should include temperature-modulated versions of such means so that, even when the flashlight is kept in a dark furniture drawer, daily temperature variations in the building will provide a source of oscillatory external energy. Feedthrough 603'a connects the approximately +3V potential (or other as may be appropriate) of battery stack 602a–602b (e.g., D size cylindrical batteries) to one end of the load 601' while spring coupling 603'b connects the subcircuit 600A" to the lower, spring connected part of battery stack 602a–602b. It is within the contemplation of this disclosure to additionally or alternatively integrate the variable capacitor means and/or other parts of the CIPR system within one or more of the batteries and/or within the walls of the flashlight body. Note that in the latter case, body heat from the hand of the holder can be a source of recharging energy as well as other ambient sources of external and modulating temperature that can more efficient couple thermally to the temperature-modulated variable capacitor means. (Additionally or alternatively, the batteries of stack 602a–602b may define a mechanically oscillatable mass or masses which convert ambient shocks or vibrations into modulations of a motion-modulated variable capacitor means.)

Figure 6D:
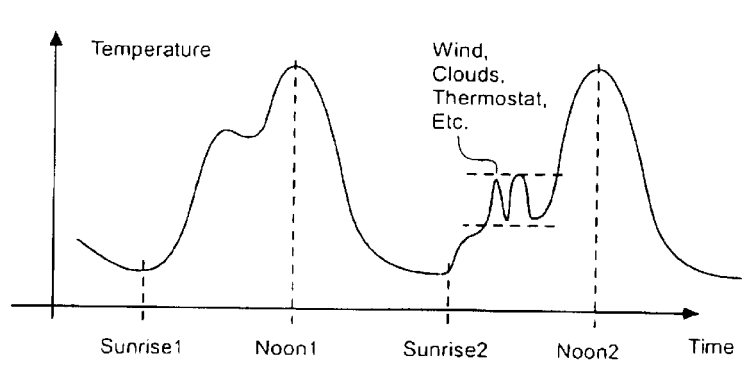
FIG. 6D is a graph showing how temperature variations may be exploited by a temperature-modulated system in accordance with the present disclosure.

Even inside insulated buildings, ambient temperature fluctuations may be used for generating electrical energy. FIG. 6D shows for purpose of example that ambient temperature inside a building tends to rise between sunrise and noon of each day on a fairly consistent basis (assuming there is not a very tight, automatic temperature control system in the environment where the emergency flashlight 600" is stored). In a loosely controlled, automated thermostatic environment, temperature should also oscillate between high and low limits as the thermostat clicks the furnace or air-conditioning on and off in a bang-bang control fashion. It is not a good idea to run the AC step-up transformer 604a–604b constantly because the energy loss from driving the transformer 604a–604b and keeping the secondary-side rechargeable voltage source unit (e.g., supercapacitor) 610' constantly at $V_1$ may exceed the energy gain from occasional temperature fluctuations. A temperature-modulated, variable capacitor means 615'd (FIG. 6B) may be used to detect when a useful temperature fluctuation (up and/or down) might be occurring and to temporarily fire up the DC-to-AC-to-DC bidirectional converter 605a–605b at such times so as to opportunistically power up the secondary-side voltage source unit (e.g., supercapacitor) 610' just when an energy profit may be reaped. Since the ambient temperature (650') is roughly the same for all parts of the system, a direct electrical coupling to others of the temperature-modulated variable capacitors (615'a–615'c) is unnecessary. The control and profit making VCM's may be simply, thermally intercoupled (651', 652'–654'). In addition to, or as an alternative to temperature-based firing of the DC-to-AC-to-DC bidirectional converter 605a–605b, a timer 607 may be used to select the appropriate time for step-up style priming operations and/or step-down energy recoupment operations. The voltage $V_1$ at node 611' may, of course, be used as yet another trigger for determining when temporary step-up and/or step-down operations of the DC-to-AC-to-DC bidirectional converter 605a–605b should be initiated. An appropriately programmed, low-power microcomputer or other sequencer (not shown) may s be used for intelligently controlling the operations of the DC-to-AC-to-DC bidirectional converter 605a–605b. The specifics of such intelligent control tend to vary with unique environments and are outside the purview of this disclosure.

To roughly summarize the disclosure thus far, it has been shown by way of various examples that electrostatic charge my be attractively condensed within a VCM (variable capacitor means) when the VCM is at a first energy state and then the condensed charge may be purged or otherwise evaporated (dispersed) by a shift of the VCM to second energy state while the charge remains substantially trapped in the VCM, where the shift causes the condensed charge to gain energy. Many opportunities exist or can be made to exist for carrying out such energy production. FIG. 7 is a partially dissected, perspective view of a hybrid automobile 700 that may be structured in accordance with the present disclosure so as to recapture waste heat, waste vibrations, or other energy and thereby improve the efficiency of the combined, combustion engine and electrical battery. (Although the example is that of a hybrid automobile, other hybrid energy systems—part electrical, part other—may make similar use of the teachings provided herein.) As with conventional hybrid designs, a rechargeable battery pack 710 is operatively coupled (783) to an electromagnetic current generator 780. The generator 780 is driven by an internal combustion engine 750, for example, a four stroke, four cylinder engine with a piston displacement of about 2 liters or less. Electromagnetic motors such as the one shown at 790 are operatively coupled (793—the associated drive electronics is not shown) to the rear wheels of the car and to its battery pack 710 for propelling the car 700 and recapturing braking power during braking events (e.g., driving downhill). The relatively small internal combustion engine 750 recharges the battery pack 710 at times when the current from its electromagnetic current generator 780 is not fully consumed for driving the rear-wheel drive motors 790. The mass of the battery pack 710 may be mounted within a shock absorbing shell and the mechanical oscillations of such a reciprocatably mounted pack or of electrolyte fluid within the pack may be used to produce electrical energy in accordance with other CIPR subsystems disclosed herein.

One or more CIPR subsystems may be operated in accordance with the present disclosure to convert otherwise wasted forms of energy from the engine 750 or from other sources into further electrical energy for charging the battery pack 710 (beyond what generator 780 provides). For example, the engine mounts 752 that would conventionally convert engine vibrations substantially into waste heat, may have variable capacitor means built into them (e.g., per FIG. 4C) for converting vibrations (using resilient dielectric layers) and/or for converting transient heat generated from such engine vibrations into electrical energy.

As another example, the shock absorbers 764 of the vehicle may have variable capacitor means built into them (e.g., liquid dielectric with variable $\in_R$ due to lower or higher dielectric constant particles suspended therein) for converting vibrations and/or transient heat from road shocks/vibrations into electrical energy. (The shock absorber typically includes a pneumatically controlled damper for absorbing the jousts of the road as well as the recoils of the suspension spring or springs.)

As yet another example, a variable capacitor means 766 of a rotary kind may be built into the front and/or rear wheel assemblies for acting as regenerative brakes. Although regenerative energy may be recouped from the electromagnetic wheel driving motors 790, the amount of energy for this latter form of regeneration depends on rotational speed. As speed drops, magnetically generated voltage drops. On the other hand, the electrostatically based CIPR systems 766 that are added to the front and/or rear wheel assemblies produce charge profit even as the wheels rotate slowly, thereby extracting more electrical energy out of a braking action than would conventionally be possible with only a regeneration system that uses only electromagnetic interaction. The electrostatically based CIPR systems 766 can be made of relatively low-mass (low weight) materials unlike the ferromagnetic materials typically used for electromagnetic regeneration. Thus their incorporation into the vehicle (e.g., hybrid car 700) does not add substantial mass so as to detrimentally affect the fuel economy of the vehicle.

Typically, a relatively-massive flywheel is attached to the crankshaft of the multi-stroke, internal combustion engine so as to smooth out the motion of the crankshaft between the episodic explosions that take place within successive ones of the engine cylinders and so as to transfer the energy of the explosion cycle in one cylinder to the compression and/or intake cycles of others of the engine cylinders. The mass of the conventional engine flywheel is not infinite however, and it therefore cannot fully absorb all the transient energies generated by each episodic explosion of each engine cylinder that is in its combustion cycle. Some of the energy is wasted in simply vibrating the pistons and crankshaft at high frequencies (ultimately converted to waste heat energy). Some of the excess vibrations is seen as engine vibration which is absorbed by the engine mounts 752. Other parts of the waste vibrations can be transmitted along the drive train. In accordance with the present disclosure, the generally massive, engine flywheel is split into two or more flywheels 771, 772 (each of less mass than the conventional single flywheel) and torsion springs 773 are provided between them. The springs 773 couple one flywheel (771) in the series to the next (772). High frequency angular energy that cannot be immediately absorbed by a first flywheel (771) in the series can be temporarily stored in the inter-flywheel spring and discharged over time. The temporary angular disparities between the flywheels 771, 772 can be converted into useful electrical energy by forming a variable capacitor means between counterfacing parts (e.g., rim surfaces) of the flywheels. As the angular disparities between the flywheels 771, 772 change due to torsioning and detorsioning of spring 773, the variable capacitor means switches between charge condensing (priming) states and charge evaporating (purging) states to thereby produce electrical energy. The end flywheel 772 in the series couples to the electromagnetic current generator 780 for turning the generator at a relatively steady rotational speed while the combustion engine 750 is running. In one embodiment, whenever the combustion engine 750 is shut off and slows to a stopped state, the split flywheels 771, 772 are temporarily decoupled mechanically from one another so that flywheel 771 can continue to power the electromagnetic current generator 780 with stored flywheel energy.

In one embodiment, the electromagnetic current generator 780 has a dual rotor design with a shared stator and/or a shared housing and/or shared bearing mounts. One of the dual rotors couples to the engine 750 and/or engine-driven flywheel series 771, 772, 773. The other of the dual rotors couples to a free-running flywheel 782 that defines a variable capacitor means. Excess energy can be temporarily stored in the free-running flywheel 782 and then extracted from that flywheel via one or both of the electromagnetic current generator 780 and the variable capacitor means that is integrated with that flywheel 782. As the speed of the free-running flywheel 782 drops, the velocity-sensitive electromagnetic generator 780 becomes less efficient in converting rotational energy into electrical energy of appropriate voltage for charging the battery pack. However, the variable capacitor means that is integrated with flywheel 782 can generate the appropriate voltage for charging the battery pack 710 even as the flywheel slows, thereby improving the energy discharge properties of the flywheel system. Once again, it should be appreciated that the present teachings regarding how otherwise wasted, vibrational energy and/or rotational energy may be recaptured for nonwasteful use is not limited to just hybrid vehicles. They can be employed wherever opportunities present themselves for such recapture.

One of the biggest forms of waste energy within an internal combustion engine (or any other heat driven, conventional engine for that matter) is the waste heat of the combustion cycle. Typically, a fluid cooling s system such as that defined by waterways (waterjackets) in the engine block, the water pump (751) and the main radiator of the car is used to simply dump away the waste heat so that the engine block does not melt or deform. In accordance with the present disclosure, alternate-action radiators 760 may be employed with temperature-modulatable, variable capacitor means (e.g., FIG. 4C) integrated into the cooling fins and/or other parts of such radiators 760. The hot, output fluid (e.g., steam and/or water) of the engine cooling system is routed (directed) by alternate action valves or gates (not shown) to one of the alternate-action radiators 760 while the other radiator cools to a temperature closer to ambient. Then the alternate action valves/gates (not shown) are switched so that the hot, output fluid is routed to the cooled-down radiator while the previously heated radiator and its circulating working fluid is allowed to cool. The temperature-modulatable, variable capacitor means within the alternate-action radiators 760 therefore have their respective capacitances modulated between charge condensing and charge evaporating states in accordance with earlier discussions herein. These temperature-modulatable, variable capacitor means form parts of respective CIPR systems for converting at least part of the waste heat of the engine 750 into electrical energy. The electrostatically-generated electrical energy may then be routed to the rechargeable batter pack 710 and/or the wheel drives 790 or elsewhere as may be appropriate. Temperature-modulatable, variable capacitor means may be integrated as well into the cylinder walls of the engine 750 so as to take advantage of the inherently modulating temperatures of the combusting fuel in the cylinders. The exhaust manifolds and/or tail-end mufflers may also have temperature-modulatable and/or pressure-variable variable capacitor means integrated into them near the engine block proper for converting part of the waste heat and/or pressure waves in the exhaust gases into useful electrical energy.

The energy collecting environments discussed herein; which run the gamut from hybrid cars (FIG. 7) to building roofs, ocean buoys, balloons, and wind swayed trees (FIG. 3A) are merely examples. It should be noted that the planet Earth is a naturally vibrant source of energies because of the annual shifts between winter and summer, daily shifts between day and night, the rising and falling tides (whose seemingly slow, but powerful motions can be used to drive higher frequency tickler systems), the waves in the ocean, the gusts of winds, the tremblings of earthquake prone locations, the turbulent action of water rushing down streams, and so on and so on. Once it is understood that multitudes of naturally modulating energy sources are available and that others can be made to oscillate by use of shutters, valves, oscillating mirrors, and so forth, the challenge becomes to find the more economically viable ones in each unique environment (e.g., the sun-parched desserts near the Equator versus the wind-swept plains of the middle America versus the wave-splashed shores of various water bodies) and to find ways of economically transmitting donor charge and harvested purge between the different kinds of variable capacitor means and the places where their generated electrical energies can be usefully employed.

Another challenge is to find economical materials for forming the various kinds of variable capacitor means and energy couplings means (e.g., balloons, buoys, wind turbines/sails, etc.) Advances can be expected in the underlying technologies of rechargeable batteries and variable and nonvariable capacitors which will make the present teachings even more economically viable and compact in size. For example, scientists are learning to fashion with so-called nanotubes, the equivalents of insulation covered wires, where an inner nanotube is electrically conductive and an outer nanotube or polymer spiral defines an electrically insulative dielectric. Parallel stacks of such primitive structures can form the basis of high-capacitance electrostatic storage devices. One end of each of such insulated nanowires could be made as a blowable fuse and the opposed end as a connectable terminal. Random alignment of nanotubes between larger conductive plates will result in about 50% of the fusible ends being adjacent to one connection plate and the other about 50% of the fusible ends being adjacent to the other connection plate. A sufficiently large initiation current should be able to blow the fuses, leaving behind a high-capacitance electrostatic storage device. If the dielectric constant of the insulative nanotubes can be made to vary with temperature, that would be the basis for a very compact, temperature-modulated variable capacitor means. See for example: United States Patent Application 20020048143 A1 by Lee, Young-hee ; et al. published Apr. 25, 2002, entitled Supercapacitor Using Electrode of New Material and Method of Manufacturing the Same, which publication is incorporated herein by reference. See further, United States Patent Application 20020068170 A1 by Smalley, Richard E.; et al. published Jun. 6, 2002, entitled Polymer-wrapped Single Wall Carbon Nanotubes, which publication is also incorporated herein by reference.

Figure 8A:
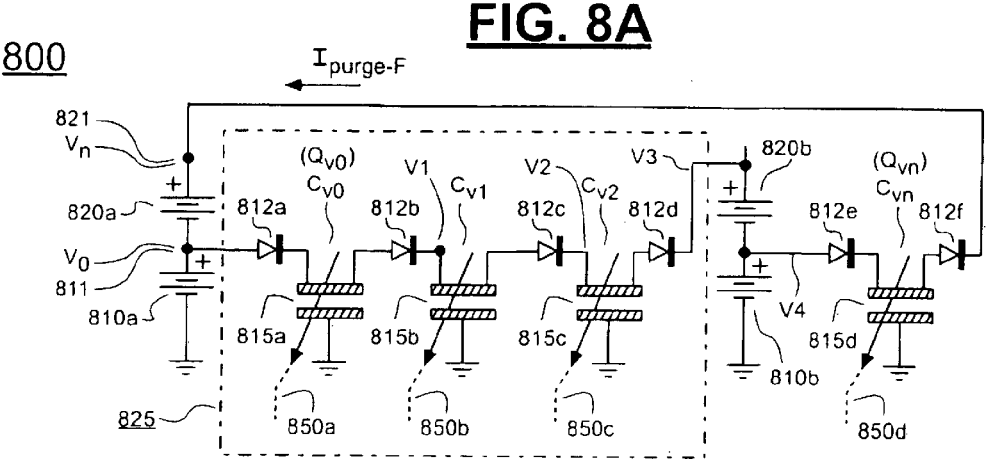
FIG. 8A is a schematic diagram of a sixth, charge-investing, profit recapturing system that carries out number of separately implementable operations, including: (8A.1) round-robin charge donation and profit recovery; (8A.2) horizontal voltage ratcheting; and (8A.3) electrode-ended valving.

FIG. 8A is a schematic of a variation 800 on the simple CIPR system introduced in FIG. 1A. In FIG. 8A, a number of separable or concurrently implementable concepts are shown. These include: (1) round-robin charge donation and profit recovery; (2) horizontal voltage ratcheting; and (3) electrode-ended valving.

The round-robin concept is illustrated by the fact that a first charge supplying means (e.g., first voltage source) 810*a* donates charge into a charge-pumping means such as 825 while a separate, pumped-charge recovery means 810*b*/820*b* collects the more energized charge that is output by diode 812*d*. Then, in its turn, portion 810*b* of the series-connected combination of rechargeable storage elements 810*b* and 820*b* donates charge into a charge-pumping means such as shown at 815*d* while the separate, pumped-charge recovery means defined by rechargeable storage elements 810*a* and 820*a* collects the more energized charge that is output by diode 812*f*. Thus, FIG. 8A illustrates a method of producing electrical energy from other energies supplied by one or more energy sources (850*a*, 850*b*, 850*c*, 850*d*—etc. there could be more as well as a fewer number) where the s method comprises: (a) condensing an investment charge ($Q_{v0}$) in a first variable capacitor means 815*a* so as to establish a first voltage ($V_0$) across the first variable capacitor means; (b) trapping the condensed electrical charge ($Q_{v0}$) in the first variable capacitor means; (c) while the condensed electrical charge ($Q_{v0}$) is trapped, using one or more of the available energy sources (e.g., 850*a*) to decrease and/or reverse the charge condensing abilities of the first variable capacitor means (815*a*) so as to establish a second voltage ($V_1$) across the first variable capacitor means, where the second voltage is substantially greater than the first voltage ($V_0$); (d) releasing the trapped electrical charge (e.g., using diode 812*b*) from the first variable capacitor means after the second voltage ($V_1$) is established; and (e) directing at least part of the released charge to an profit charge storing means (e.g., 815*b* and/or 820*b*/810*b*) that can then re-invest the directed charge as condensed investment charge (e.g., $Q_{vn}$) in another variable capacitor means (815*d*) and/or ultimately back (e.g., via diodes 812*b*–812*f*, 812*a*) into the first variable capacitor means (815*a*).

It is to be understood of course, that the respective variable capacitor means such as shown at 815a, 815b, 815c and 815d may be of same or different kinds as may have been described herein and that their respective energy sources, 850a, 850b, 850c and 850d may be same or of different kinds as may have been described herein. Initially, the voltage $V_1$ across variable capacitor 815b may be substantially less than $V_3$ (the voltage across charge-storage combination 820b/810b). Voltage $V_1$ will be at least close to $V_0$ because diodes 812a and 812b will charge it to that minimal level. The forward drop of these diodes is assumed to be relatively negligible here. Diodes such as 812a, 812b could be Schottky type such as might be formed by integrating the metal or metal-like-behaving material of the upper electrode of capacitor 815a with semiconductor-like-behaving materials of further parts of diodes 812a, 812b. If, on the other hand, the assumption about the diode forward drops is incorrect, appropriate adjustments should be made to present discussion.

When the $Q_{v0}$ charge in variable capacitor $C_{v0}$ (815a) is squeezed out (i.e. because the 815a sponge is driven by energy source 850a from its $C_{v0MAX}$ state to its $C_{v0MIN}$ state), that squeezed out amount of charge ($Q_{v0}$) is added to the charge stored in variable capacitor $C_{v1}$ (815b). It is assumed that the 815b sponge is in its $C_{v1MAX}$ state when this happens. In one embodiment, $C_{v2MAX}C_{v1MAX}<C_{v0MAX}$ so that an inherent voltage increasing (up ratcheting) effect occurs as a certain amount of invested charge is squeeze-wise pushed successively from one variable capacitor means and absorbed into the next (e.g., from 815a to 815b). In other words, under this condition the voltage relationship: $V_3>V_2>V_1>V_0$ will develop when the respective capacitors are in their $C_{vjMAX}$ states (j=1, 2, 3, . . . ). Even if the progressive reduced-capacitance relationship between the successive variable capacitors is not true, invested charge will work its way from donor source 810a into variable capacitor $C_{v3}$ (815c) as energy sources 850a and 850b repeatedly squeeze and de-squeeze their respective sponges, 815a and 815b. When energy source 850c squeezes its charge sponge 815c, the charge ($Q_{v3}$—not shown) of variable capacitor $C_{v3}$ will be driven at least partially into profit-recovering device 820b (e.g., a rechargeable battery). The squeezed-out charge ($Q_{v3}$) should also flow into a next, at least one, charge absorbing device (e.g., 820a—a rechargeable battery and/or 815d—a variable capacitor means) of the round-robin structure 800. When energy source 850d squeezes its charge sponge 815d, the charge ($Q_{vn}$) of that variable capacitor means $C_{vn}$ will be driven at least partially into profit-recovering device 820a. The squeezed-out charge ($Q_{vn}$) should also flow into a next, at least one, charge absorbing device (e.g., 820a, 815a, 815b, 815c). With repeated modulations of energy sources 850a–850d, the following voltage relationship should develop when the respective capacitors are all in their $C_{vjMAX}$ states (j=1, 2, 3, . . . ): $V_n>V_4<V_3>V_2>V_1>V_0<V_n$.

Energy sources 850a–850d may be organized to modulate in a predefined order or they may modulate independently and/or randomly. In one embodiment, each of variable capacitor means 815a–815d normally remains in its respective $C_{vjMAX}$ state and is intermittently switched into its $C_{vjMIN}$ state by the more energetic phase of its respective energy source 850a–850d. Other embodiments may have different relationships between the more, or less-energetic phases of their respective energy sources. Of course, the round-robin arrangement can extended to have more than just two stages (810a/825 and 810b/815d) coupled in round-robin fashion. Moreover, multiple copies of stage 825 can be provided in parallel between battery combinations 810a/820a and 810b/820b. Multiple copies of the diode-VCM-diode structure: 812e–815d–812f may be additionally or alternatively provided in parallel between battery combinations 810a/820a and 810b/820b or their equivalents. Each of these multiple copies may be constituted by nano-fiber like and/or dendritically-grown variable capacitor means such as will be described in regards to FIG. 8B. In other words, thousands or millions of microscopically sized or molecularly-sized copies of diode-VCM-diode structures may be coupled to a given one or more battery combinations such as 810a/820a and 810b/820b or their equivalents and energized by respective, local energy sources like 850a–850d for energizing invested charge and pumping it up a voltage gradient and allowing for recovery of charge profit.

Figure 8B:
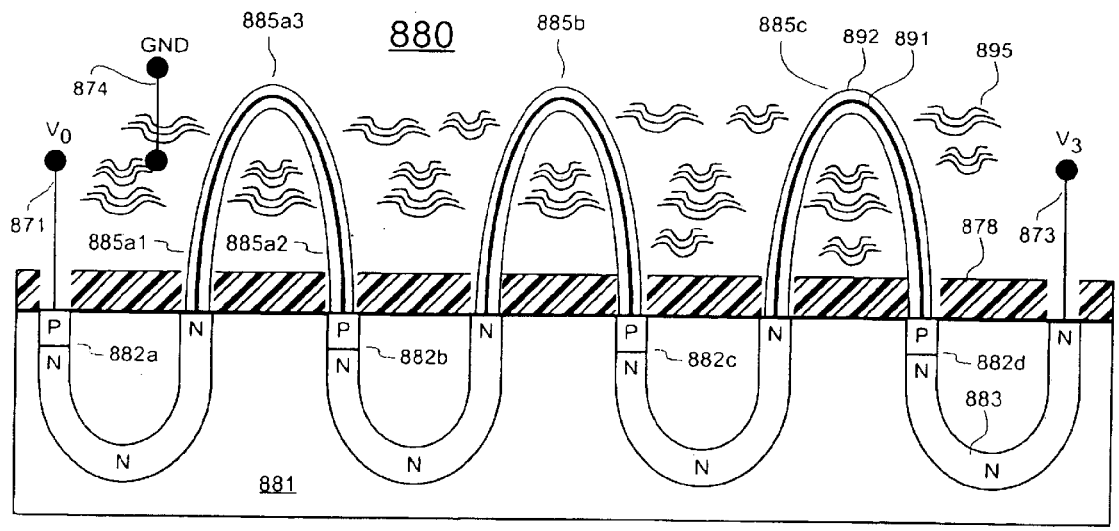
FIG. 8B is a cross sectional view of a valves-ended (e.g., diodes-terminated) capacitor electrode structure that may be realized in accordance with the disclosure.

The above-mentioned concepts of (2) horizontal voltage ratcheting and (3) electrode-ended valving have been indirectly set forth in the description of the round-robin structure. The series-connected diode-VCM combinations: 812a/815a and 812b/815b and the diode-VCM-diode combination 812c/815c/812d can provide the horizontal voltage ratcheting effect. Diode means such as 812c and 812d can be advantageously integrated at opposed ends of capacitor electrodes. FIG. 8B illustrates one embodiment 880 in which such electrode-ended valving is provided. Electrically isolated PN junctions such as shown at 882a, 882b, 882c and 882d are provided within an appropriate substrate 881 (e.g., a semiconductive s substrate). A first electrically isolated terminal 871 supplies the $V_0$ voltage level to the P side of junction 882a. A second electrically isolated terminal 873 supplies the $V_3$ voltage level to the N extension 883 of junction 882d. A third terminal 874 supplies the GND (ground) voltage level to a liquid or liquid-like electrolyte 895 (e.g., salty water). Arches 885a, 885b, and 885c represent the valve-ended,. capacitor electrodes that define integrated diode-VCM combinations. In one embodiment, sheath 892 acts as a temperature-modulated dielectric. In another embodiment, sheath 892 has a relatively fixed dielectric constant while the concentration of the GND-defining electrolyte 895 changes with time about different ones of the valve-ended, capacitor electrodes (885a, 885b, 885c, etc.) as a result of heat-induced convection and/or other causes (e.g., ocean waves).

In one embodiment, conductors 891 are nano-fibers or otherwise structured and dendritically-grown conductors that are each covered by dielectric sheaths such as 892. A method of manufacture may comprise the following steps. Provide the substrate 881 with a plurality of current rectifying structures such as 882a, 882b, etc. integrally defined therein and distributed as micron sized or submicron-sized entities. Seed the surface exposed, P and N sections with particles for catalyzing growth of electrically-conductive nanotubes and/or electrically-conductive dendritic structures 891. Begin upward growth of the nanotubes and/or other electrically-conductive dendrites. Deposit insulative layer 878 so as to leave dendrite ends partially sticking up above layer 878. Continue the upward growth of the electrically-conductive dendrites. Using separately-constructed and insulated terminals like 871 and 873 (which will ultimately be sheathed for insulation from ground fluid 895), develop electrostatic field between adjacent ones of the electrically-conductive dendrites for urging the dendrites (e.g., section 885a1 and 885a2) to merge together while continuing their growth (e.g., with such merger occurring at a region like 885a3). Using electroplating like techniques, grow the dielectric sheath material 892 around the grown dendrites 891 until exposed surface area of the dendrites is minimized. Introduce the electrolyte fluid 895 so as to enter the pores between the grown and dendrites and electrically couple the ground (GND) terminal to the fluid. Finally, for use, incorporate the so-constructed, variable capacitor 880 into a CIPR system such as the one 800 shown in FIG. 8A.

Various other methods could be used for creating large-surface area, variable capacitor devices including use of aerogel structures and super-porous carbon structures with the dielectric layer being deposited by electroplating or otherwise. Also the rectifying structures: 882a, 882b, etc. could be integrated along the chains of dendrites 891 and insulatively sheathed (892) with them during manufacture as an alternative or addition to providing such rectifying structures in a supporting substrate like 881.

In one embodiment, a structure such as shown in FIG. 8B (irrespective of whether the sheathed dendrite arches 885a, 885b, etc. are of molecular dimensions, i.e. nanofibers, or of larger dimensions) is situated upside down relative to gravity so that the electrolyte fluid 895 is trapped at least partially in thermally insulating columnar tubes. A heat source (e.g., a solar power-wise driven thermal conductor with thermal insulation around it except at its ends) induces convection currents in the fluid 895 so that capacitance changes for each of the arches (885a, 885b, etc.) as fluid regions of differing dielectric constants and/or local temperatures move between the arches. The localized fluctuations pump charge from the $V_0$ terminal 871 to the more-energized $V_3$ terminal 873. The $V_3$ terminal 873 may then connect to a battery series such as 820b/810b shown in FIG. 8A.

Figure 9:
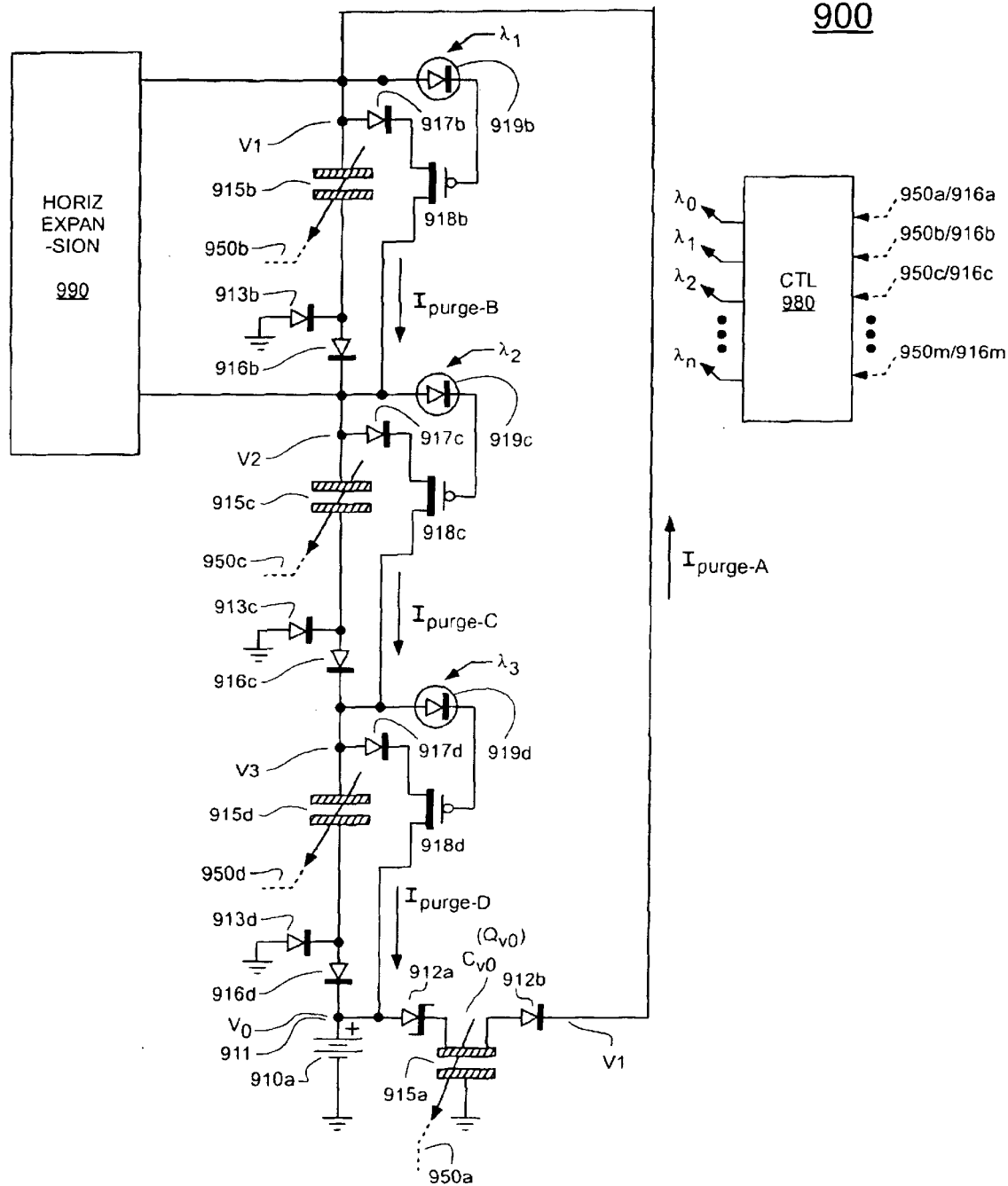
FIG. 9 is a schematic diagram of a seventh, charge-investing, profit recapturing system that provides vertical charge multiplication.

Referring to FIG. 9, yet another CIPR system 900 is schematically illustrated. As in others of the CIPR systems described above, the original voltage, $V_0$ at node 911 is provided by a rechargeable battery 910a or another form of charge donating and recouping means. Diode 912a carries priming charge ($Q_{\nu 0}$) into a first variable capacitor means (VCM) 915a. An external energy source 950a modulates VCM 915a between its charge condensing and charge evaporating (charge expulsion) modes. Diode 912b carries a first purge current $I_{purge-A}$ out of VCM 915a when the voltage across VCM 915a reaches the purge level, $V_1 > V_0$. In one embodiment, the priming diode 912a is a Zener diode or another controlled breakdown kind of diode which is structured to limit $V_1$ to be no more than, say 10V or 100V or 500V greater than $V_0$.

If all of controllable switches 918b, 918c, 918d (e.g., PMOS transistors) are in their nonconductive modes—and assuming that the illustrated horizontal expansion circuit is not present or is not able to absorb charge at the moment—then the first purge current I*purge-A* flows serially through respective variable capacitor means (VCM's) 915b, 915c, 915d and into at least one of battery 910a and a bottom level VCM like 915a. (Usually VCM 915a is in its nonabsorbent mode at this stage, being that it is squeezing out the I*purge-A* current. However, there could be other VCM's like 915a (not shown) hooked in parallel to node 911 (in a horizontal expansion fashion) and these other VCM's might be in respective charge absorbing states. Preferably while the first purge current $I_{purge-A}$ flows, each of VCM's 915b, 915c, and 915d is in its maximum charge absorbing mode (e.g., $C_{viMAX}$) so that each can absorb the purged charge ($Q_{\nu 0}$) flowing through with a relatively minimal voltage drop across that VCM. Battery 910a also absorbs at least part of the purged charge ($Q_{\nu 0}$). The initial charge profit at this stage can be the excess above what battery 910a originally donated, namely the $Q_{\nu 0}$ amount plus the repetition of the $Q_{\nu 0}$ amount of charge in each of VCM's 915b, 915c, and 915d. If there were more such VCM's coupled in series, the initial charge profit would be greater, but then so too would be the voltage, $V_1$ developed across the full series of capacitors. It is not advisable to let $V_1$ become astronomically large (e.g., larger than about 1000V relative to ground).

In a next step, while the first VCM 915a remains in its squeezed state, the second VCM 915b squeezes out its $Q_{\nu 0}$ amount of charge, this occurring while controllable switches 918c and 918d remain in their nonconductive modes. Controller 980 detects (and/or causes) the charge expelling state of energy source 950b and/or of a secondary VCM 916b (not shown) that like VCM 915b is driven by source 950b or by a complementary source; and in response outputs optical signal $\lambda_1$ to thereby switch element 918b into a conductive mode after the trapped charge in the second VCM 915b has gained a useful amount of energy (e.g. raising the voltage drop across VCM 915b to a value substantially greater than $V_0$). The purged current, $I_{purge-B}$ flows through diode 917b and through VCM's 915c and 915d, as well as into battery 910a. Ground return current flows through diode 913b. (Appropriate steps should be taken to prevent PMOS transistors 918c and 918d from turning on during this stage.) The charge profit at this secondary stage can be the additional $Q_{\nu 0}$ amount of charge that has just passed into battery 910a when VCM 915b discharged its energy, plus the 2 times $Q_{\nu 0}$ amount of charge that should now be stored in each of VCM's 915c and 915d.

In a next step, VCM 915c squeezes out its 2 times $Q_{\nu 0}$ amount of pre-stored charge while controllable switch 918d remains in its nonconductive mode. Controller 980 detects (and/or causes) the charge expelling state of energy source 950c and/or of a secondary VCM 916c (not shown) that like VCM 915c is driven by source 950c or by a complementary source; and in response outputs optical signal $\lambda_2$ to thereby switch element 918c into a conductive mode. The purged current, $I_{purge-C}$ flows through diode 917c and through VCM 915d, as well as into battery 910a. Ground return current flows through diode 913c. The charge profit from this tertiary stage can be the additional 2 times $Q_{\nu 0}$ amount of charge that has just passed into battery 910a when VCM 915c discharged, plus the 4 times $Q_{\nu 0}$ amount of charge that should now be stored in VCM 915d.

In a yet next step, VCM 915d squeezes out its 4 times $Q_{\nu 0}$ amount of pre-stored charge. Controller 980 detects (and/or causes) the charge expelling state of energy source 950d and/or of a secondary VCM 916d (not shown) that like VCM 915d is driven by source 950d or by a complementary source; and in response outputs optical signal $\lambda_3$ to thereby switch element 918d into a conductive mode. The purged current, $I_{purge-D}$ flows through diode 917d and into battery 910a. Ground return current flows through diode 913d. The total charge profit that battery 910a can therefore recoup from such a cycling of VCM's 915a, 915b, 915c, 915d is the sum of the 1 times $Q_{\nu 0}$ amount squeezed from VCM 915b plus the 2 times $Q_{\nu 0}$ amount squeezed from VCM 915c plus the 4 times $Q_{\nu 0}$ amount squeezed from VCM 915d.

Other permutations of charge absorption, expulsion and current routing can of course be used. Controller 980 can be a low-power CMOS microcomputer or the like which makes decisions on how to route priming and purged current based on detected availabilities and sequences of charge-expelling energy sources such as 950a–950m. Control coupling signals other than the illustrated optical ones, $\lambda_0$–$\lambda_n$ may be used if desired. (The $\lambda_0$ signal corresponds to energy source 950a and may be used for triggering events related to switching of source 950a.) The various optical control signals, $\lambda_0$–$\lambda_n$ alleviate the problem of level shifting control signals to the varying voltages that may be present in each of the vertical stages of CIPR system 900. Each vertical stage (including the base stage represented by VCM 915*a*) may be horizontally expanded to have many, separately-energized VCM's actuated by respective energy sources (e.g., 950*m*). Horizontal expansion part 990 is shown for purpose of example. Similar horizontal expansion can be provided at the other levels including the base level of VCM 915*a*. A vertically and horizontally expanded matrix of VCM's with accompanying current routing devices can devised as may be desired. The controller 980 may be used to orchestrate the switchings of the various energy sources 950*a*–950*m* and/or the switchings of the various current gates 918*b*–918*d*, etc.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications filed pursuant to 35 U.S.C. §120 and/or 35 U.S.C. §251.

What is claimed is:

1. A charge investing and profit capturing (CIPR) energy production system comprising:
    (a) a variable capacitor means that is adapted for having its capacitance varied by an external energy source;
    (b) priming means coupled to supply electrical charge to the variable capacitor means for condensing the supplied charge in the variable capacitor means so as to establish a first voltage across the variable capacitor means; and
    (c) purge control means for substantially trapping the condensed electrical charge in the variable capacitor means until a second voltage is defined across the variable capacitor means due to the external energy source decreasing and/or reversing the charge condensing abilities of the variable capacitor means, where the second voltage is greater than the first voltage; and where the purge control means is further for releasing at least part of the trapped charge and directing the released charge to the priming means after said second voltage is defined across the variable capacitor means.

2. A method of producing electrical energy from other energy supplied by one or more energy sources, the method comprising:
    (a) condensing an investment charge in a first variable capacitor means so as to establish a first voltage across the variable capacitor means;
    (b) substantially trapping the condensed electrical charge in the first variable capacitor means;
    (c) while the condensed electrical charge is substantially trapped, using the one or more energy sources to decrease and/or reverse the charge condensing abilities of the first variable capacitor means so as to establish a second voltage across the first variable capacitor means, where the second voltage is substantially greater than the first voltage;
    (d) releasing the trapped electrical charge from the first variable capacitor means after the second voltage is established; and
    (e) directing at least part of the released charge to an investment charge storing means that can then re-invest the directed charge as condensed investment charge in the first variable capacitor means and/or in another variable capacitor means.

3. A charge investing and profit capturing (CIPR) energy production system for producing electrical energy, the CIPR system comprising:
    (a) a charge condensing and expelling means (QC&E means) that is adapted for condensing charge in a charge condensing mode and for expelling the condensed charge in a charge purging mode, where said charge condensing and charge purging modes occur in response to variations of one or more external energy sources;
    (b) charge investing means coupled to supply first electrical charge to the charge condensing and expelling means when the latter, QC&E means is in its charge condensing mode; and
    (c) expulsion control means for substantially trapping the condensed electrical charge in the charge condensing and expelling means until there is a substantial increase in voltage across the QC&E means due to action of said one or more external energy sources; where the expulsion control means is further for releasing at least part of the trapped charge and directing the released charge to the charge investing means and through a profit capturing means.

4. The CIPR system of claim 3 wherein said QC&E means includes:
    (a.1) a first set of charge collecting members coupled to the charge investing means and to the expulsion control means; and
    (a.2) a second set of charge collecting members that are electrostatically coupled to the first set of charge collecting members and moveable relative to the first set of charge collecting members such that movement of one or more charge collecting members in the second set causes charge to alternatively condense within and be expelled from electrostatically coupled, counterpart members of the first set.

5. The CIPR system of claim 4 wherein said QC&E means further includes:
    (a.3) charge trapping means coupled to the second set of charge collecting members and moveable with the second set of charge collecting members for causing charge to accumulate and be substantially trapped in the charge collecting members of the second set.

6. The CIPR system of claim 4 wherein said QC&E means further includes:
    (a.3) a secondary charge condensing and expelling means (QC&E2 means) that is coupled to the second set of charge collecting members and moveable with the second set of charge collecting members for causing charge to fluctuate in the charge collecting members of the second set, the QC&E2 means being adapted for condensing charge in a charge condensing mode and for expelling the condensed charge in a charge purging mode, where said charge condensing and charge purging modes of the QC&E2 means occur in response to variations of one or more, additional, external energy sources.

7. The CIPR system of claim 4 wherein:
(a.1a) the first set of charge collecting members at least partially surround the second set to define an outer shell and at least one of the charge investing means and the expulsion control means integrally extends from the outer shell.

8. The CIPR system of claim 4 wherein:
(a.2a) the second set of charge collecting members are coupled to an oscillating means which causes the second set to move in oscillating relationship relative to the first set in response to the oscillating means being tickled by a surge of energy from at least one of said one or more external energy sources.

9. The CIPR system of claim 8 wherein at least one of said one or more external energy sources is selected from the group consisting of: a wind energy collector, a liquid wave energy collector, and a thermal energy collector.

10. The CIPR system of claim 4 wherein:
(a.2a) the second set of charge collecting members at least partially surround the first set to define an outer shell and at least one of the charge investing means and the expulsion control means integrally extends from an inner shell defined by the first set of charge collecting members.

11. The CIPR system of claim 10 wherein said outer shell rotates relative to the inner shell in response to energy supplied by at least one of a fluid current energy collector, a fluid wave energy collector, and a thermal energy collector.

12. The CIPR system of claim 3 wherein:
(a.1) said charge condensing and expelling means (QC&E means) that is adapted for switching between said charge condensing and charge purging modes occur in response to variations of temperature.

13. The CIPR system of claim 12 wherein:
(a.1a) said QC&E means includes a moveable radiation reflector for causing said variations of temperature.

14. The CIPR system of claim 12 wherein:
(a.1a) said QC&E means includes a moveable balloon that rises and descends at least in response to variations of temperature.

15. The CIPR system of claim 12 wherein:
(a.1a) said QC&E means includes a moveable fluid flow director which alternatingly directs flows of relatively cool fluid and relatively hotter fluid towards the QC&E means to thereby induce at least part of said variations of temperature.

16. The CIPR system of claim 12 wherein:
(a.1a) said QC&E means includes at least one of:
  (a.1a1) a temperature-variable dielectric whose dielectric constant varies in response to local variations of temperature;
  (a.1a2) a resilient dielectric whose dielectric constant and/or thickness vary in response to local variations of pressure; and
  (a.1a3) a combination of material layers having counterpart, relatively high and relatively low coefficients of thermal expansion (COTE's) for effecting changes in at least one of charge condensing and charge purging characteristics of said QC&E means in response to variations of temperature.

17. The CIPR system of claim 3 wherein said charge investing means includes at least one of:
  (b.1) a rechargeable electric battery;
  (b.2) a capacitor;
  (b.3) a bidirectional DC to AC converter;
  (b.4) a photovoltaic array;
  (b.5) an RF-to-DC demodulator; and
  (b.6) a variable capacitor means.

18. The CIPR system of claim 3 wherein said expulsion control means includes:
  (c.1) one or more solid state diodes.

19. The CIPR system of claim 3 and further comprising as said one or more external energy sources at least one of:
  (d.1) alternate action radiators of a thermally driven engine;
  (d.2) a vibration damping means which converts vibration energy into other forms of energy;
  (d.3) a mechanically oscillating member;
  (d.4) a wind driven member;
  (d.5) a liquid flow or wave driven member;
  (d.6) a shock absorbing member; and
  (d.7) a motion braking member.

20. The CIPR system of claim 3 wherein said QC&E means includes:
  (a.1) a plurality of electrically conductive nanofibers.

21. An energy converter comprising:
(a) a rechargeable lender of electrical investment charge;
(b) a dischargeable collector of electrical profit charge;
(c) a variable charge condenser that is drivable between a charge condensing first state and a charge de-condensing second state;
(d) a first selective charge router, operatively coupled to the rechargeable lender and to the variable charge condenser for selectively routing the investment charge from the lender to the variable charge condenser when the variable charge condenser is in or substantially near the first state;
(e) a second selective charge router, operatively coupled to the variable charge condenser and to the dischargeable collector for selectively routing the profit charge from the variable charge condenser to the collector when the variable charge condenser is in or substantially near the second state; and
(f) investment recoupment means, operatively coupled to the variable charge condenser and to the rechargeable lender for returning to the lender, an investment recoupment charge equal to at least a substantial portion of the investment charge.

22. The energy converter of claim 21 and further comprising:
(g) profit sharing means operatively coupled to the collector and to the lender for recharging the lender with at least part of the profit charge collected by the collector so that even if said investment recoupment charge is insufficient to fully compensate the lender for charge lost by the lender in having lent said investment charge, the at least part of the profit charge that is used to recharge the lender will account for at least part of the difference, if any, between the lent investment charge and the investment recoupment charge.

23. The energy converter of claim 21 wherein the dischargeable collector includes a rechargeable battery.

24. The energy converter of claim 21 wherein the rechargeable lender includes a rechargeable battery.

25. The energy converter of claim 21 wherein the first selective charge router includes a series of unidirectional current routers.

26. A system for generating electrical charge in response to energy supplied from one or more energy sources, the system comprising:

(a) a rechargeable lender of electrical investment charge;

(b) a dischargeable collector of electrical profit charge;

(c) a variable charge condenser that is drivable by one or more energy sources to switch between a charge condensing first state and a charge de-condensing second state; and (d) current routing means for causing at least one of a priming current and a purging current to flow through a series of condensors, said series of condensers including said variable charge condenser, said flow of current through the series of condensors being such that the lender recoups a substantial portion of its loaned investment charge and such that the dischargeable collector collects a profit charge generated from said at least one of the priming current and purging current flowing through the series of condensers.

27. The charge generating system of claim 26 wherein said one or more energy sources is a fluctuating energy source and the system further includes:

(e) a mechanical energy storing subsystem for causing the variable charge condenser to continue switching between the charge condensing first state and the charge de-condensing second state even when the fluctuating energy source temporarily stops providing drive energy.

28. The charge generating system of claim 27 wherein said mechanical energy storing subsystem includes a flywheel.

29. The charge generating system of claim 27 wherein said mechanical energy storing subsystem includes an oscillatory spring-mass combination.

30. The charge generating system of claim 26 wherein:

(c.1) said variable charge condenser includes charge attraction/repulsion means for condensing charge with use of charge attraction and for de-condensing charge with use of charge repulsion.

31. The charge generating system of claim 26 wherein:

(c.1) said variable charge condenser includes a fluid dielectric.

32. The charge generating system of claim 26 wherein:

(c.1) said variable charge condenser includes a temperature-variable dielectric whose dielectric constant varies substantially in response to variations of temperature.

33. The charge generating system of claim 26 wherein:

(c.1) said variable charge condenser includes first and second charge retaining electrodes and a dielectric layer interposed between the first and second charge retaining electrodes, where the first charge retaining electrode is movable relative to the second charge retaining electrode and where the interposed dielectric layer is movable independently of the first and second charge retaining electrodes.

34. The charge generating system of claim 26 wherein:

(c.1) said variable charge condenser includes a pressure-variable dielectric whose dielectric constant varies substantially in response to variations of pressure.

35. The charge generating system of claim 26 wherein:

(c.1) said variable charge condenser is mechanically coupled to a cable that transmits electrical energy.

36. A method for generating electrical charge comprising:

(a) condensing an obtained amount of investment charge;

(b) de-condensing at least part of the condensed investment charge;

(c) recouping an amount of charge substantially equal to the amount of de-condensed investment charge; and (d) collecting additional profit charge in excess of the difference between the obtained amount of investment charge and the recouped amount of charge so as to provide a net gain of charge.

37. The charge generating method of claim 36 wherein:

(b.1) said de-condensing is driven by energy of a moving object.

38. The charge generating method of claim 36 wherein:

(b.1) said de-condensing is driven by a fluctuating heat source.

39. The charge generating method of claim 36 wherein:

(b.1) said de-condensing is driven by a fluctuating pressure source.

40. An electrical current manufactured from a generating method comprising:

(a) condensing an obtained amount of investment charge, (b) de-condensing at least part of the condensed investment charge, (c) recouping an amount of charge substantially equal to the amount of de-condensed investment charge, and (d) collecting additional profit charge so as to provide a net gain of charge;

where the manufactured electrical current increases as a result of said collecting of the additional profit charge.

41. A structure comprising:

(a) a first structure part that provides a fluctuating or moving source of energy; and (b) charge investing and profit capturing means operatively coupled to the first structure part so as to convert the fluctuating or moving energy of the first structure part into electrical energy by way of condensing an obtained amount of investment charge, de-condensing at least part of the condensed investment charge, recouping an amount of charge substantially equal to the amount of de-condensed investment charge, and collecting additional profit charge so as to provide a net gain of charge.

42. The structure of claim 41 wherein said structure includes a building and further wherein:

(a.1) said first structure part comprises a first movable part of the building; and (a.2) said physical reference comprises a second part of the building.

43. The structure of claim 41 wherein said structure includes a transportation vehicle that is energetically propelled at least partially by electrical energy and further wherein:

(a.1) said first structure part comprises a first movable part of the transportation vehicle; and (b.1) said charge investing and profit capturing means contributes at least part of said net gain of charge for the electrical propulsion of said vehicle.

44. The structure of claim 41 wherein said structure includes an electrical energy transmitting system and (b.1) said charge investing and profit capturing means contributes at least part of said net gain of charge for transmission through the electrical energy transmitting system.

45. The structure of claim 44 wherein said electrical energy transmitting system includes a moveable cable and
  (a.1) said first structure part is moved at least partially by movement of the moveable cable.

46. The structure of claim 41 wherein:
  (a.1) the first structure part has a temperature that changes substantially; and
  (b.1) the charge investing and profit capturing means is operatively coupled to the first structure part so as to convert the temperature changes of the first structure part into electrical energy.

47. The structure of claim 46 wherein said charge investing and profit capturing means includes a ferroelectric material having a Curie temperature (Tc) of less than about 1000 ° C.

48. The structure of claim 46 wherein said charge investing and profit capturing means includes a ferroelectric material having a Curie temperature (Tc) of less than about 300° C.

49. The structure of claim 46 wherein said charge investing and profit capturing means includes first and second materials of substantially different coefficients of thermal expansion.

50. The structure of claim 46 wherein said first structure part is operatively coupled to a fluid director that alternatingly directs relatively hot and comparatively cooler fluid towards the first structure part.

* * * * *